United States Patent
McDonnell et al.

[11] Patent Number: 6,151,096
[45] Date of Patent: Nov. 21, 2000

[54] LIQUID CRYSTAL DISPLAY INCLUDING DOPANT PHASE-SEPARATED FROM LIQUID CRYSTAL

[75] Inventors: Damien Gerard McDonnell, Malvern Link; John Clifford Jones, Malvern, both of United Kingdom; Teiyu Sako, Kashiwa, Japan; Aya Miyazaki, Tenri, Japan; Akira Sakaigawa, Kawasaki, Japan; Mitsuhiro Koden, Kashiwa, Japan; Paul Antony Gass, Headington; Michael John Towler, Botley, both of United Kingdom

[73] Assignees: Sharp Kabushiki Kaisha, Osaka, Japan; The Secretary of State for Defence in Her Britannic Majesty's Government of the United Kingdom of Great Britain and Northern Ireland, Hants, United Kingdom

[21] Appl. No.: 08/982,555

[22] Filed: Dec. 2, 1997

[51] Int. Cl.$^7$ .............................. G02F 1/13; G02F 1/1333; C09K 19/02
[52] U.S. Cl. .......................... 349/188; 349/187; 349/172; 349/85
[58] Field of Search ..................................... 349/187, 188, 349/172, 85, 173

[56] References Cited

U.S. PATENT DOCUMENTS

| | | |
|---|---|---|
| 4,367,924 | 1/1983 | Clark et al. .............................. 350/334 |
| 4,712,877 | 12/1987 | Okada et al. ............................. 350/350 |

(List continued on next page.)

FOREIGN PATENT DOCUMENTS

| | | |
|---|---|---|
| 0586014 | 3/1994 | European Pat. Off. . |
| 0595219 | 6/1994 | European Pat. Off. . |

(List continued on next page.)

OTHER PUBLICATIONS

Kataoka et al., Texts of the 21$^{st}$ Liquid Debate, Sep. 10, 1995, "Liquid Crystalline Polymer Stabilized FLCDs".

Meyer et al., Le Journal De Physique, vol. 36, 1975, p. L–69, "Ferroelectric Liquid Crystals".

Jones et al., Ferroelectrics, 1991, vol. 121, pp. 91–102, The Importance of Dielectric Biaxiality for Ferroelectric Liquid Crystal Devices.

Jiu–Zhi et al., Liquid Crystals, 1987, vol. 2, No. 5, pp. 707–716, "Electrooptical Switching Properties of Uniform Layer Tilted Surface Stabiled Ferroelectric Liquid Crystal Devices".

Hikmet et al., Liquid Crystals, 1995, vol. 19, No. 1, pp. 65–76, "Ferroelectric Liquid Crystal Gels Network Stabilized Ferroelectric Displays".

(List continued on next page.)

*Primary Examiner*—William L. Sikes
*Assistant Examiner*—Tarifur R. Chowdhury
*Attorney, Agent, or Firm*—Renner, Otto, Boisselle & Sklar, L.L.P.

[57] ABSTRACT

A mixture of a ferroelectric or anti-ferroelectric liquid crystal material and a monomer having a single photopolymeric functional group is injected in the space between two electrode substrates while heat is applied. After cooling of the mixture it is irradiated with ultraviolet light at a temperature at which the liquid crystal material remains in the smectic phase so as to polymerise the monomer. Areas of liquid crystal material requiring different threshold voltages for switching are thereby produced. Alternatively such areas can be produced by changing the conditions applied to a mixture of liquid crystal material with a suitable dopant so as to cause separation of the dopant out of the liquid crystal material in order to provide a polarity of nucleation points for controlling domain formation within the liquid crystal material. Such control of domain formation can be used to provide greyscale in a liquid crystal device.

20 Claims, 14 Drawing Sheets

U.S. PATENT DOCUMENTS

| | | | |
|---|---|---|---|
| 4,796,980 | 1/1989 | Kaneko et al. | 350/350 |
| 4,904,064 | 2/1990 | Lagerwall et al. | 350/350 |
| 5,434,685 | 7/1995 | Pirs et al. | 359/51 |
| 5,646,754 | 7/1997 | Takeda et al. | 349/172 |
| 5,812,230 | 9/1998 | Sakaigawa et al. | 349/85 |
| 5,850,272 | 12/1998 | Kabe et al. | 349/126 |
| 5,936,690 | 8/1999 | Koden et al. | 349/124 |

FOREIGN PATENT DOCUMENTS

| | | |
|---|---|---|
| 0665279 | 8/1995 | European Pat. Off. . |
| 0 782 032 A2 | 2/1997 | European Pat. Off. . |
| 56-107216 | 8/1981 | Japan . |
| 3-048819 | 3/1991 | Japan . |
| 4-127124 | 4/1992 | Japan . |
| 6194635 | 7/1994 | Japan . |
| 7-248489 | 9/1995 | Japan . |
| 2294797 | 5/1996 | United Kingdom . |

OTHER PUBLICATIONS

Hughes et al., Liquid Crystals, 1993, vol. 13, No. 4, pp. 597–601, "A New Set of High Speed Matrix Addressing Schemes for Ferroelectric Liquid Crystal Displays".

Kanbe et al., Ferroelectrics, 1991, vol. 114, pp. 3–26, "High Resolution, Large Area FLC Display with High Graphic Performance".

Barberi et al., Appl. Phys. Lett. 58, 1991, pp. 2907–2909, "Electrochirally Controlled Bistable Surface Switching in Nematic Liquid Crystals".

Matsui et al.; Sony Corporation Research Center, "Two Types of Starlight Texture Produced Using a New Analog Gray–Scale Technique".

Bos et al., Mol. Cryst. Liq. Cryst., 1984, vol. 113, pp. 329–339, The pi–Cell: A Fast Liquid–Crystal Optical–Switching Device.

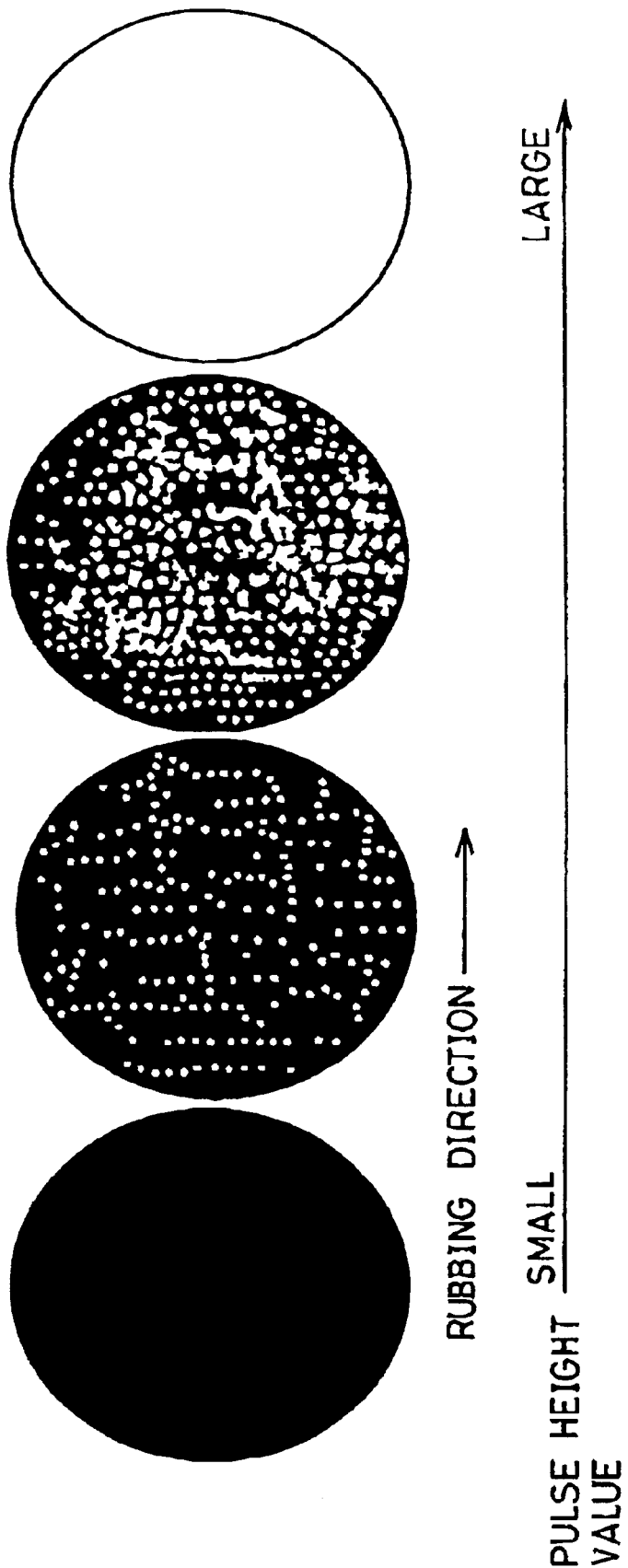

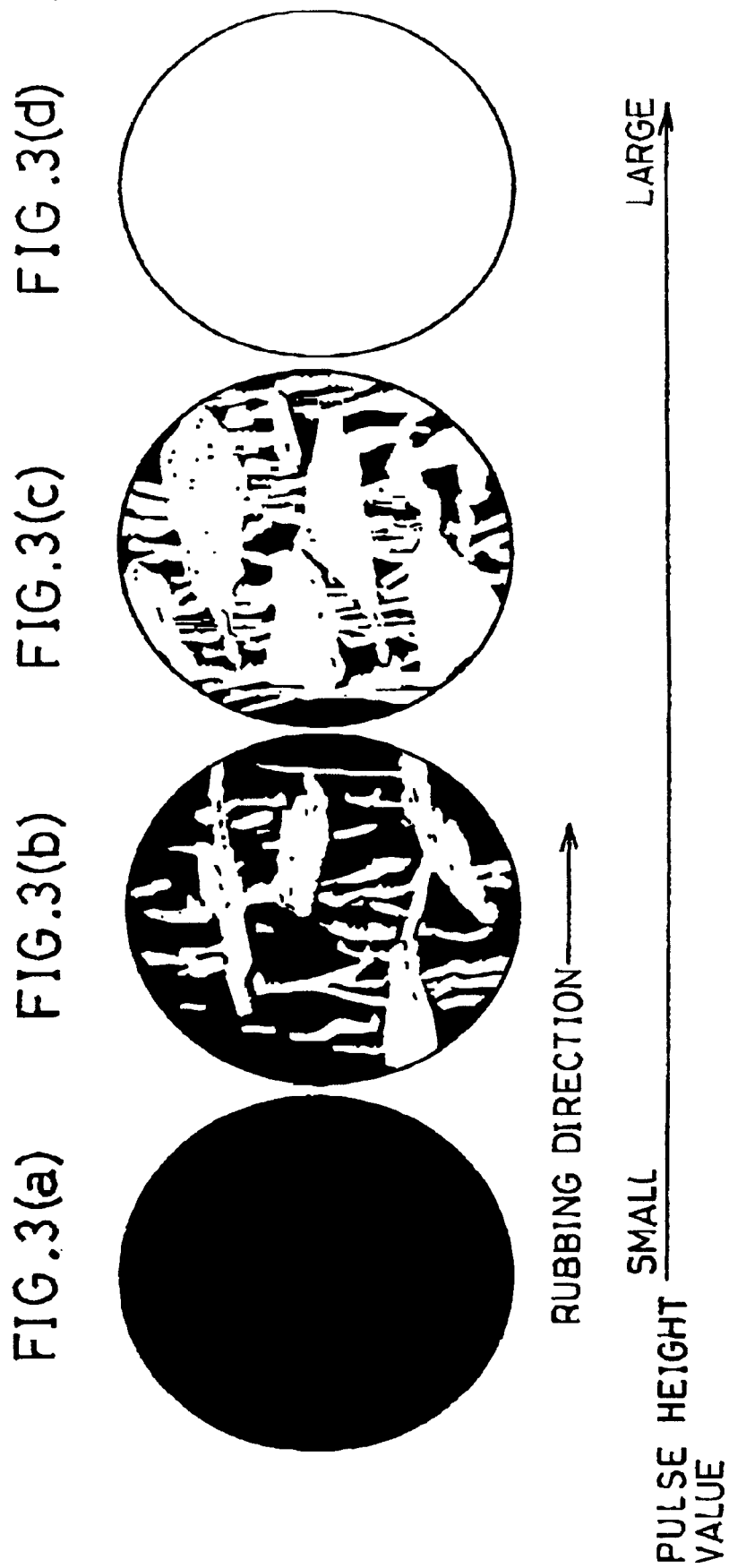

(1)

where 6M8 represents $C_2H_5CH(CH_3)C_5H_{10}$.

(2)

(3)

(4)

(5)

FIG.15
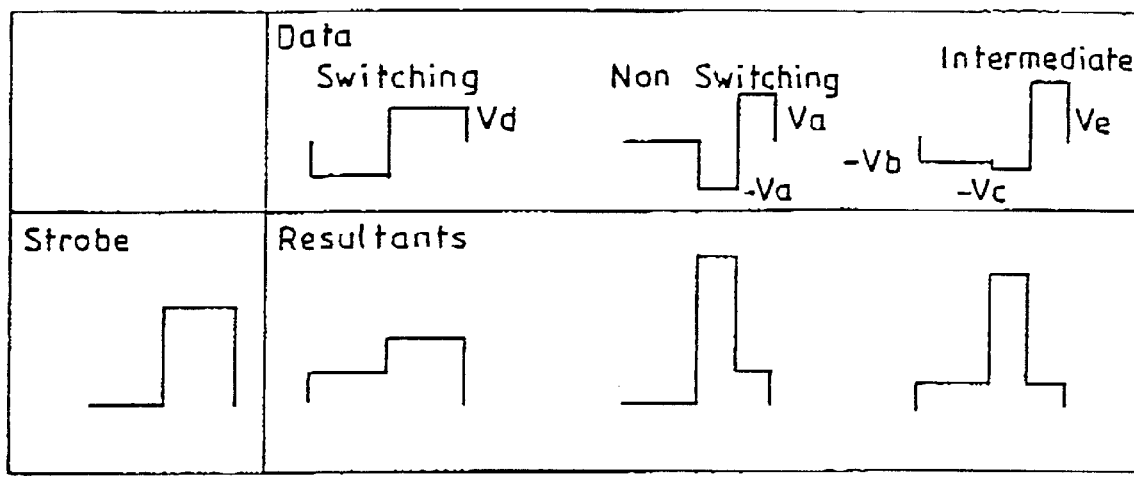
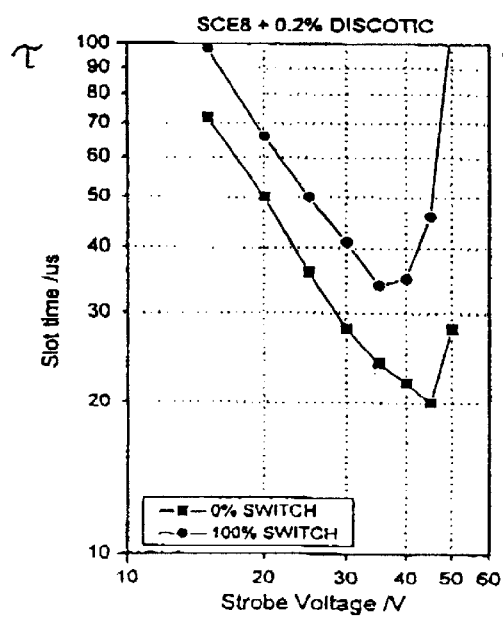
FIG.17(a)
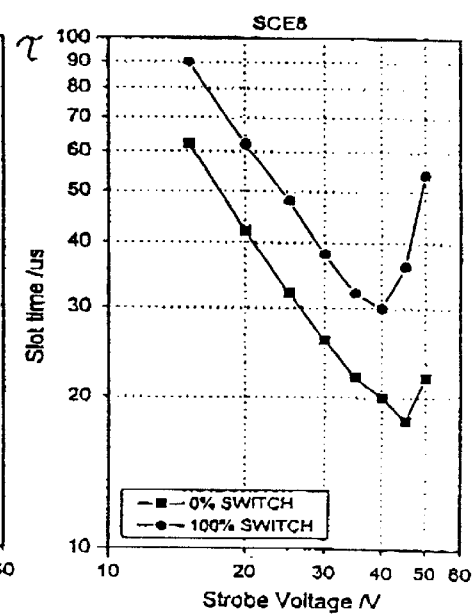
FIG.17(b)

FIG.16(a)
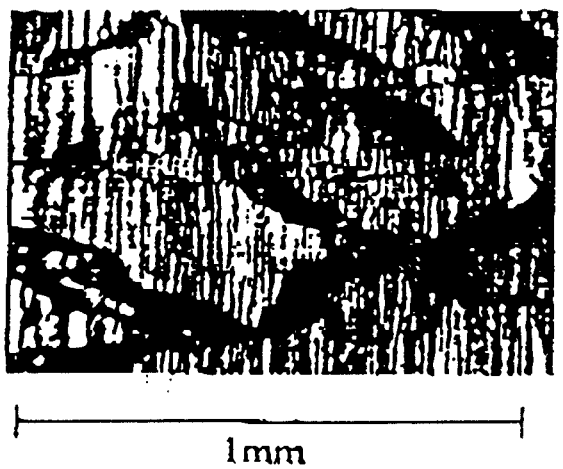
Typical 300um square pixel divided into 3 coloured sub-pixels
|← 1mm →|
Domain switching in pure SCE8
FIG.16(b)
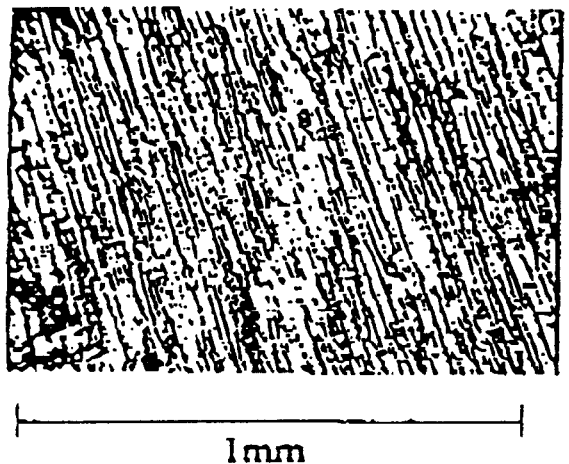
Typical 300um square pixel divided into 3 coloured sub-pixels
|← 1mm →|
Domain switching in SCE8 plus 0.2% DB126

LIQUID CRYSTAL DISPLAY INCLUDING DOPANT PHASE-SEPARATED FROM LIQUID CRYSTAL

FIELD OF THE INVENTION

This invention relates to liquid crystal devices and methods of manufacturing such devices, and is concerned more particularly, but not exclusively, with the control of greyscale in ferroelectric or antiferroelectric liquid crystal displays, light shutters, optical filters, photosensors and the like.

BACKGROUND OF THE INVENTION

TN (Twisted Nematic) type and STN (Super-Twisted Nematic) type liquid crystal display devices using a nematic liquid crystal material are well-known. However, such liquid crystal display devices cause screen disturbance or lower contrast when driven at high speed because their electrooptical response rate is of the order of a millisecond. Furthermore such liquid crystal display devices have only a limited display capacity, and are not therefore suited to the display of a motion picture. In addition, the viewing angle of TN type and STN type liquid crystal display devices is too narrow to be used for a large-scale screen. Thus, considerable interest is being shown in liquid crystal display devices using ferroelectric or antiferroelectric liquid crystal material for such applications.

In 1975, R. B. Mayer et al. synthesised DOBAMBC (2-methylbutyl p-[p(decyloxybenzylidene)-amino]-cinnamate) on the assumption, based on the symmetry property theory, that, if optically active molecules have a dipole moment perpendicular to the major axis of the optically active molecule, the molecules exhibit a ferroelectric property in the chiral smectic C phase (SmC* phase), and succeeded in demonstrating this ferroelectric property in the liquid crystal material for the first time (see J. Phys. (Parts) 36 (1975) L69, R. B. Mayer, L. Liebert, L, Strzelecki and P. Keller).

FIG. 8 (a) shows a model of a smectic layer structure within a liquid crystal material and the molecular alignment in the ferroelectric SmC* phase. Although the position of the centre of gravity of the molecules within the layer is arbitrary, as shown schematically in the figure by cones 101, the major axis (director 102) of each liquid crystal molecule is tilted at a certain angle θ with respect to the normal z to the smectic layer 103. The tilt direction of the director 102 is shifted slightly between each layer, so that the liquid crystal material exhibits a helical structure. The helical pitch is approximately 1 μm which is substantially greater than an interlayer space of 1 nm or so.

Clark and Lagerwall discovered that the helical structure is lost as the cell thickness approximates to 1 μm (substantially as thick as the helical pitch), and instead, as shown in FIG. 8 (b), the molecules 104 in each layer are switched to one of two stable states in response to an applied voltage. Based on this discovery, Clark and Lagerwall devised a surface stabilised ferroelectric liquid crystal (SSFLC) cell, examples of which are disclosed in Japanese Laid-open Patent Application No. 107216/1981 (Tokukaisho No. 56-107216) and U.S. Pat. No. 4,367,924.

In FIG. 8 (b), an electric field E which extends perpendicularly, from the rear to the front of the drawing, is applied to the molecules 104. In addition, the electric dipole moment of each molecule 104 is aligned along the direction of the electric field E, as illustrated inside each molecule 104 in FIG. 8 (b).

As shown in FIG. 9, the molecules 104 in the SSFLC are in one of two stable states A and B depending on the orientation of the applied electric field. In state A, the electric field −E, which is oriented from the front to the rear of the drawing, is applied to the molecules 104, whereas, in state B, the electric field +E is oriented in the opposite direction.

As shown diagrammatically in FIG. 9, the SSFLC is placed between a polariser having a polarisation axis indicated by the arrow $P_1$ and a polariser (analyser) having a polarisation axis indicated by the arrow $P_2$ in such a manner that the major axis of the molecule is aligned along the axis $P_1$ in state B, for example. The SSFLC cell therefore transmits light in state A to produce a light state and blocks the light in state B to produce a dark state. Thus the SSFLC cell acts as a black-and-white display in response to switching of the direction of the applied electric field.

In the SSFLC, a drive torque is generated by interaction of the spontaneous polarisation and the applied electric field. Therefore, in contrast to a conventional nematic liquid crystal device using dielectric anisotropy, the response rate to the electric field is of the order of a microsecond. Moreover, once the SSFLC has been switched to one of the two stable states, the SSFLC can remain in the same stable state even after the electric field has been removed, so that the SSFLC has a memory function. Thus, a voltage does not have to be applied to the cell all of the time.

As explained, the required display contents can be written into the SSFLC cell by scanning line-by-line using its characteristics of fast response and memory function. When combined with passive matrix driving circuitry, such a SSFLC cell structure enables a display of large capacity to be realised, which can be used in a flat television set to be hung on a wall, for example.

Thus a SSFLC device possesses the advantage over other liquid crystal devices, such as the twisted nematic liquid crystal device, that it is a bistable device which can be switched between two states by switching pulses of alternate polarity and which will remain in one state in the absence of a switching pulse until a switching pulse of appropriate polarity is applied to switch it to the opposite state. By contrast, in operation of a twisted nematic liquid crystal device, a drive signal must be applied continuously to maintain the device in one of its states. SSFLC devices are of particular interest in multiplexed applications as the level to which such devices can be multiplexed is not restricted by the need to re-address particular pixels within a very short time frame.

Strictly speaking, a ferroelectric liquid crystal display device can display only two transmission levels, that is light and dark, because of the bistability of the liquid crystal molecules in the SmC* phase. However, in practice, the FLC display device can realise greyscale to some extent by using time modulation (temporal dither), spatial modulation (spatial dither), or the fast modulation of the applied electric field. However the application of such techniques can cause the structure of the driving system and/or the panel production process to become complicated, thus undesirably increasing manufacturing costs.

In order to change the state of a SSFLC it is necessary to apply a voltage signal of a particular magnitude and polarity across the device for a finite duration. However, in certain applications, it is possible to arrange for partial switching of the device by reduction of the voltage and/or duration of the signal applied across the device so that only a part of the liquid crystal material in the relevant area of the device changes state. Where the device is a display device and the two fully-switched states correspond to black and white states, such partial switching can be used to provide an analogue greyscale. However the control of the greyscale is rendered difficult by the difficulty in controlling domain formation during partial switching of the device.

A number of proposals have previously been made for controlling domain formation in a ferroelectric liquid crystal device. For example a technique is disclosed in JP 03048819 (Matsushita) and JP 04127124 (Asahi Glass) for fabricating arrays of microstructures within the device to provide nucleation points. However this technique requires extra cell fabrication steps which add to manufacturing difficulty and cost. Furthermore E. Matsui and A. Yasuda, FLC 95 Abstracts (1995) 97–99 and EP 0595219A (Sony) discloses a technique in which small balls are distributed in the liquid crystal material to act as nucleation points. However it is difficult to obtain good uniformity of these balls within the material.

Japanese Laid-open Patent Application No. 194635/1994 (Tokukaihei No. 6-194635) (Reference No. 1) and EP 0586014A (Philips) discloses a technique for forming a structure in which non-reactive chiral liquid crystal molecules are captured an anisotropic 3-D network structure made of a polymeric substance. According to this technique, the network structure stabilises microscopic domains having opposite polarisation directions, so that a greyscale can be maintained even after the applied electric field has been removed. However, because of the relatively high concentration of polymer which remains within the liquid crystal material and the 3-D network structure, the viscosity of the liquid crystal material is increased and this tends to lead to slower switching.

Furthermore, Japanese Laid-open Patent Application No. 248489/1995 (Tokukaihei No. 7-248489) (Reference No. 2) discloses a technique for forming within a liquid crystal material a microscopic 3-D network synthetic resin extending along the direction in which the alignment treatment is applied. This technique involves irradiating a mixture of the liquid crystal material and a synthetic resin material with ultraviolet radiation at a temperature at which the mixture remains in the nematic phase. In this manner a greyscale can be realised by forming a plurality of domains which are separated out of the 3-D network synthetic resin material and each of which has a respective threshold voltage.

However, in the technique of Reference No. 1, the switching domains are not regular and do not remain the same size when a voltage is applied. Further, since the liquid crystal molecules are constrained by the 3-D network structure, the response rate to the applied electric field is slowed down considerably, as the liquid crystal molecules are in the monostable state in some areas. Also, if the ratio of chiral materials added to the host liquid crystal material is increased, the liquid crystal material is not aligned in a satisfactory manner, thereby causing the display quality to deteriorate.

Similarly, in the technique of Reference No. 2, the regularity and size control of the domains are not satisfactory. This gives rise to the problems that the liquid crystal molecules are constrained by the 3-D network synthetic resin and the contrast is lowered. Furthermore, since the domain size is not sufficiently small as compared with the pixel size (0.3 mm square), it is almost impossible to realise a greyscale display in practice.

SUMMARY OF THE INVENTION

It is an object of the invention to provide a liquid crystal device in which domain formation is controlled within the liquid crystal material in a particularly straightforward manner, for example with the object of controlling greyscale in a liquid crystal display.

According to the present invention there is provided a method of manufacturing a liquid crystal device which includes a cell comprising a layer of liquid crystal material contained between two substrates, the method including the steps of:

(a) adding to the liquid crystal material under predetermined applied conditions a dopant which is miscible with the liquid crystal material under said conditions; and (b) changing the conditions applied to the liquid crystal material so as to cause separation of the dopant out of the liquid crystal material in order to provide a plurality of nucleation points for controlling domain formation within the liquid crystal material.

Furthermore the invention provides a liquid crystal device including a cell comprising a layer of liquid crystal material contained between two substrates, the liquid crystal material incorporating a dopant which has been mixed with the liquid crystal material under predetermined applied conditions and which has been caused to separate out of the liquid crystal material due to a change in the applied conditions in order to provide a plurality of nucleation points for controlling domain formation within the liquid crystal material.

It should be understood that by nucleation points are meant points where the formation of domains occurs more easily than elsewhere in the liquid crystal material. There are two methods for providing nucleation points using phase separation. Either the phase separated dopant makes the formation of domains more difficult or the separated dopant makes the formation of domains easier. In the former case the domain nucleation points are provided intermediate the points where phase separation occurs, whereas, in the latter case, the nucleation points are provided at the points where phase separation occurs. An example of the first case is disclosed below where a monomer dopant having a single photopolymeric functional group is caused to undergo photoinduced phase separation. This provides nucleation points remote from the phase separated polymer molecules which form domains more easily than the points near the phase separated polymer molecules. An example of the second method is disclosed below where a discotic dopant is caused to undergo temperature induced phase separation. This provides nucleation points due to elastic deformation of the liquid crystal material where the phase separation occurs.

It should be understood that by separation of the dopant out of the liquid crystal material is meant a process or transition by which the material of uniform physical properties separates into two or more types of material which differ from one another in at least one of their physical properties. The separation of the dopant out of the liquid crystal material due to a change in the conditions applied to the liquid crystal material preferably occurs as a result of a change in phase of the dopant, although it may alternatively occur as a result of a change in phase of the liquid crystal material whilst the phase of the dopant remains unchanged. In tis regard it should be appreciated that such a change in phase does not necessarily result in the dopant changing from a liquid phase to a solid phase. Instead, if the dopant is of a type having two or more liquid phases separated by thermodynamic phase transition points, separation of the dopant out of the liquid crystal material may occur as a result of a change in phase of the dopant from one liquid phase to another liquid phase. In this regard the dopant may have similar phase properties to the liquid crystal material which, as is well known, will typically have a number of liquid phases, such as the isotropic phase, the nematic phase, the smectic A phase and the smectic C phase, for example.

The conditions applied to the liquid crystal material can be changed at a suitable stage in the fabrication of the device, for example by applying ultraviolet irradiation or by changing the temperature or phase, so that the dopant becomes insoluble and separates out of the liquid crystal material. Such separation preferably results in the separation of substantially the whole of the dopant out of the liquid crystal material, and in substantially uniform distribution of nucleation points within the liquid crystal material for control of domain formation and switching. The particular properties of the nucleation points, that is the size, shape and density of the nucleation points, can be controlled by suitable choice of dopant and the process by which the separation is induced. Preferably the shape of the switching domains is controlled by appropriate control of the distribution and/or shape of the nucleation points by means of these parameters.

The preferred manufacturing method for controlling domain formation in accordance with the invention is advantageous for a number of reasons. Firstly it is possible to produce a uniform distribution of nucleation points within the liquid crystal material in a straightforward manner by thorough mixing of the dopant and the liquid crystal material in the mixing step which takes place during cell fabrication, with the density, size and shape of the nucleation points being controlled by means of the concentration and chemical structure of the dopant. Secondly no extra cell fabrication steps are required to produce such nucleation points. Additionally, because the dopant separates out of the liquid crystal material to form the nucleation points, the dopant may not slow down the switching of the device to the same extent as would a uniform polymer network such as is produced within the liquid crystal material by the technique disclosed in EP 0586014A referred to above. Also the nucleation points allow control of the width and uniformity of the partial switching region in a liquid crystal display, as well as producing small uniform domains which are useful in the control of analogue greyscale, for example. It may also be possible to produce nucleation points which are too small to be resolved optically, so that such nucleation points do not degrade the optical properties of the display.

There are several applications within the field of liquid crystal displays in which it is important to control the nucleation and growth of domains, and the method of the invention may be used with advantage in such applications which include the nucleation of the V state in pi-cell devices (such as are disclosed, for example, in P. J. Boss and K. R. Koehler, Mol. Cryst. Liq. Cryst. 113 (1984) 329–339), the nucleation of switching domains in bistable nematic liquid crystal devices (such as are disclosed, for example, in R. Barberi and G. Durand, Appl. Phys. Lett. 58 (1991) 2907–9), the nucleation of switching domains in ferroelectric and anti-ferroelectric liquid crystal devices, and the nucleation of transitions between chevron states at the smectic A to smectic C phase transition of SSFLC's (such as is disclosed, for example, in J. Kanbe et al, Ferroelectrics 114 (1991) 3–26).

The invention also provides a method of manufacturing a liquid crystal device including the steps of:

mixing a monomer having a single photopolymeric functional group with a ferroelectric or antiferroelectric liquid crystal material in a smectic phase;

injecting the resulting mixture of the monomer and the liquid crystal material between the substrates of a cell having an electrode whilst applying heat; and polymerising the monomer whilst cooling the mixture by irradiating the mixture at a temperature at which the liquid crystal material remains in the smectic phase.

In the above arrangement, the polymer produced from the monomer is dispersed in the liquid crystal material, and different areas develop which have respective threshold voltages depending on whether they are close to or remote from the polymer molecules. Consequently it becomes possible to control a switching domain which is small compared with the size of a pixel. In addition, using a monomer having a single photopolymeric functional group can produce a linear chain polymer in which the liquid crystal molecules are not constrained completely. Thus this method can attain the effect of producing a practical greyscale display using a ferroelectric or antiferroelectric liquid crystal material.

The polymer so produced does not form a 3-D network structure, but instead forms a structure in which a main chain is linked to side chains formed in a smectic structure. Thus the resulting polymer is accommodated within the liquid crystal layer without disturbing the alignment of the liquid crystal molecules. In addition the molecular weight of the polymer is distributed evenly to some extent.

In a liquid crystal device produced in this manner, the liquid crystal molecules are switched by application of an electric field at a temperature in which the liquid crystal material remains in the smectic C phase, a larger electric field energy being required in the vicinity of the polymer than in areas relatively remote from the polymer. Thus the threshold voltages required for switching vary in the different areas, and it is possible for different grey levels to be displayed even though the liquid crystal material is capable of switching only between two states.

By contrast, when a monomer having more than one photopolymeric functional group is used, a 3-D network structure is formed with the result that the liquid crystal molecules are constrained in some areas, and areas develop where switching cannot easily be effected. By contrast, when a monomer having a single photopolymeric functional group is used as in the method of the invention, a long linear chain polymer is formed, and as a result the liquid crystal molecules are not constrained completely.

Preferably the amount of the monomer used in the mixing step is in the range between 0.1 wt % and 10.0 wt % based on the total weight of the mixture. This ensures that the polymer molecules are adequately distributed in the liquid crystal material. Consequently, the uniform alignment of the liquid crystal molecules can be maintained, thereby preventing the degradation of the display quality, such as contrast, whilst suppressing an increase in viscosity, and preventing a decrease in the response rate to the applied electric field.

In order to obtain a more uniform and controlled distribution of nucleation points, it may be advantageous to ensure that the mixture is biphasic over a broad temperature range. The mixture is biphasic if different regions of the mixture exist in different phases at a uniform temperature. A broad biphasic temperature range can be obtained by using materials having markedly different phase transition temperatures.

Advantageously the monomer used in the mixing step remains in an isotropic phase in a temperature range in which the liquid crystal material remains in the smectic phase. In this arrangement, the monomer is photopolymerised in the liquid state, and the polymer molecules produced from the monomer are aligned substantially uniformly along the alignment direction of the liquid crystal molecules. Thus, the polymer hardly disturbs the orientation of the liquid crystal molecules or constrains the liquid crystal molecules, so that satisfactory display quality can be maintained and the lowering of the response rate to the electric field can be suppressed.

The monomer only requires to be in the isotropic phase in the temperature range in which the liquid crystal material remains in the smectic phase, and there is no problem for example, if the monomer remains in the isotropic phase at a temperature range which extends lower than the first-mentioned temperature range.

Preferably the monomer remains in a liquid crystal phase in a temperature range in which the liquid crystal material remains in the smectic phase. In this arrangement, the monomer and the liquid crystal material have greater compatibility. Thus the polymer neither disturbs the orientation of the liquid crystal molecules nor constrains the liquid crystal molecules.

Most preferably the monomer has a liquid crystal phase which is a smectic phase of the same type as the smectic phase of the liquid crystal material. Thus the monomer is photopolymerised at a temperature at which both the liquid crystal material and the monomer remain in the smectic phase of the same type, and the resulting polymer and liquid crystal material have greater compatibility. Consequently the polymer does not disturb the alignment of the liquid crystal molecules.

One implementation of the method of the present invention includes the filter step of heating the mixture again to a temperature at which the liquid crystal material remains in a phase which is on the higher temperature side of the smectic phase, followed by cooling after the monomer is polymerised. By the use of the above steps the formation of domains which are hard to switch can be prevented The invention farther provides a liquid crystal device including a cell comprising a layer of ferroelectric or anti-ferroelectric liquid crystal material contained between two substrates and having an electrode for applying a voltage to the liquid crystal material, the liquid crystal device comprising a mixture of a monomer having a single photopolymeric functional group and a ferroelectric or antiferroelectric liquid crystal material in a smectic phase, the monomer having been polymerised by irradiation of the mixture at a temperature at which the liquid crystal material remain's in the smectic phase during cooling of the mixture subsequent to heating.

Preferably the liquid crystal material has a characteristic such that its memory-pulse-width-vs.-voltage curve has a minimum value. Thus the switching response can be accelerated if the liquid crystal molecules are switched in the switching area and the non-switching area on the high potential side which are distinguished from one another at a portion where the curve starts to rise from the minimum value. In this manner it is possible to produce a high-contrast, very bright display using the AC stabilising effect.

In order that the invention may be fully understood, several methods in accordance with the invention will now be described, by way of example, with reference to the accompanying drawings, in which:

BRIEF DESCRIPTION OF THE DRAWINGS

FIGS. 2(a) to 2(d) shows the image viewed by a microscope when a switching area develops in response to an increase in the pulse height in the liquid crystal cell of the Example;

FIGS. 3(a) to 3(d) shows the image viewed by a microscope when a switching area develops in response to an increase in pulse height in the liquid crystal cell of Comparative Example 1;

FIGS. 10(a) to 10(e) shows the chemical formulae of various substances referred to;

FIG. 15 shows pixel pattern independent (PPI) waveforms used to address the display;

FIGS. 16(a) and 16(b) show domain switching in pure SCE8 and the improvement in switching domain uniformity which results from the addition of 0.2% DB126 to SCE8; and FIG. 17(a) is a $\tau$-$V_{min}$ plot of pure SCE8, and FIG. 17(b) is a $\tau$-$V_{min}$ plot showing the effect of the addition of 0.2% DB126 on the switching speed of SCE8.

DESCRIPTION OF THE EMBODIMENTS

Figure 1:
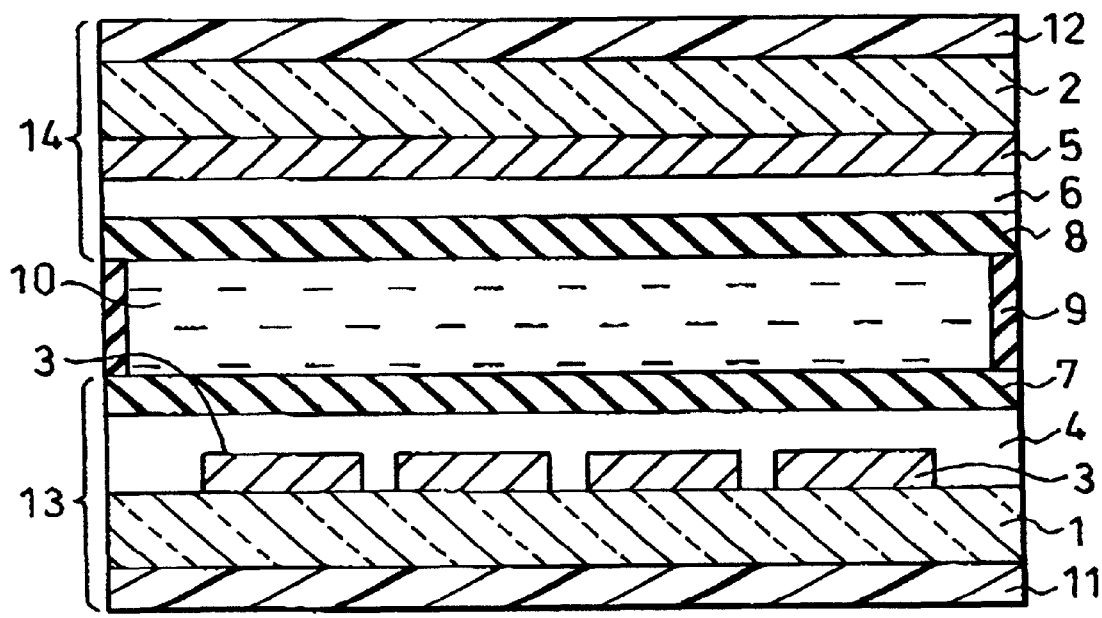
FIG. 1 is a schematic section showing the structure of a ferroelectric liquid crystal cell in accordance with an Example of the present invention.

Initially the basic structure of a ferroelectric liquid crystal (FLC) cell in accordance with the invention will be described with reference to FIG. 1. The FLC cell includes two glass substrates 1 and 2 disposed opposite one another. The glass substrates 1 and 2 can be replaced by substrates made of a resin, such as polymethyl methacrylate, if required, as long as the substrates can transmit light and provide electrical isolation.

A plurality of parallel 100 nm-tick transparent data electrodes 3, made of indium tin oxide (ITO) for example, are formed on the surface of the glass substrate 1, and a transparent insulating film 4 made of, for example, $SiO_2$, is provided on top of the electrodes 3. Furthermore a plurality of parallel transparent scanning electrodes 5, made of the same material as the data electrodes 3, are provided on the surface of the glass substrate 2 so as to intersect the data electrodes 3 at right angles, and a transparent insulating film 6, made of the same material as the insulating film 4, is provided on top of the electrodes 2. Both the scanning electrodes 5 and the insulating film 6 typically have a thickness of 100 nm as do also the data electrodes 3 and the insulating film 4.

Also typically 70 nm-thick alignment films 7 and 8, to which a uniaxial alignment treatment such as rubbing is applied, are formed on the insulating films 4 and 6, respectively. The alignment films 7 and 8 are organic high polymer films such as a polyimide film, a Nylon (Registered Trade Mark) film, a polyvinyl alcohol film or an $SiO_2$ oblique evaporation film.

A polarisation layer 11 is formed on the other surface of the glass substrate 1 to the surface on which the signal electrodes 3 are formed. Furthermore, a polarisation layer 12 is formed on the other surface of the glass substrate 2 to the surface on which the scanning electrodes 5 are formed. The polarisation layers 11 and 12 are aligned in such a manner that their respective polarisation axes intersect substantially at right angles.

Thus a first electrode substrate 13 is formed which comprises the glass substrate 1, the data electrodes 3, the insulating film 4, the alignment film 7, the polarisation layer 11, and a second electrode substrate 14 is formed which comprises the glass substrate 2, the scanning electrodes 5, the insulating film 6, the alignment film 8, and the polarisation layer 12.

Furthermore the electrode substrates 13 and 14 are spaced apart by a distance of typically 1.4 μm by means of spacers (not shown), being bonded to one another by means of a sealing agent 9. A liquid crystal layer 10 is formed in the space which is thus formed between the electrode substrates 13 and 14. The liquid crystal layer 10 is made of a ferroelectric or antiferroelectric liquid crystal material and a polymer dispersed in the liquid crystal material.

The liquid crystal layer 10 is produced in the following manner. In an initial mixing step, the liquid crystal material and a monomer having a single photopolymeric functional group are mixed with one another. It is preferable to use 0.1 wt % to 10.0 wt % of the monomer based on the total weight of the resulting mixture. In a subsequent injection step, the resulting mixture is injected into the space between the electrode substrates 13 and 14. More specifically, an empty cell is placed in a vacuum bath, and whilst being heated, the mixture is injected into the space through an opening (not shown) made through the sealing agent 9.

Subsequently the cell filled with the mixture is cooled to room temperature at a predetermined rate. During this cooling process, the cell is irradiated with ultraviolet light at a temperature at which the liquid crystal material remains in the smectic phase, to effect polymerisation of the monomer (polymerising step). When the cell is cooled to room temperature, the opening is sealed with a sealant.

At a temperature at which the liquid crystal material remains in the smectic phase, the monomer molecules and the liquid crystal molecules in the liquid crystal material are aligned uniformly in the smectic layer structure. Thus, when the monomer is photopolymerised under these conditions, the resulting polymer forms a structure in which the main chain is linked to side chains formed in a smectic structure, as will be described below. Consequently, the polymer is accommodated in the liquid crystal layer without disturbing the alignment of the liquid crystal molecules.

Furthermore, when the polymer is produced, the mixture in the cell is re-heated to a temperature at which the liquid crystal material remains in a phase on the higher temperature side of the smectic phase, after which the cell is cooled to room temperature at a predetermined rate (re-heating step). By use of the above steps, the polymer can be released from the constraint caused by interaction with the alignment films 7 and 8 of with the liquid crystal molecules. Consequently, even if hard-to-switch domains develop initially due to the interaction, the domains can be changed to a satisfactory bistable state.

The formation of the liquid crystal layer 10 will be described in detail with reference to the following example.

EXAMPLE

An FLC cell in accordance with the invention is assembled by the following steps.

A liquid crystalline acrylate monomer having a single photopolymeric functional group is mixed with a ferroelectric liquid crystal material, SCE8 supplied by Merk AG, 2.0 wt % of a polymerisation initiator having been added to the acrylate monomer in advance.

SCE8 is a ferroelectric liquid crystal material having negative dielectric anistropy and a $\tau$-$V_{min}$ characteristic. The phase series and phase transition temperatures of SCE8 are as follows:

(−20° C.) (58° C.) (78° C.) (98° C.)

CRYSTAL-SmC*PHASE-SmA PHASE-N* PASE-Iso PHASE.

However it is also possible for the liquid crystal material not to have a $\tau$-$V_{min}$ characteristic.

Figure 10A:
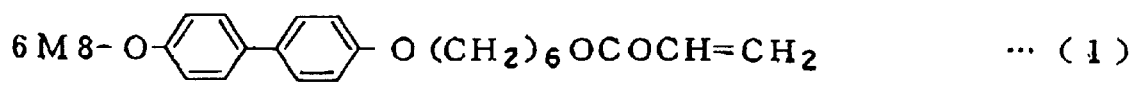
Figure 10B:
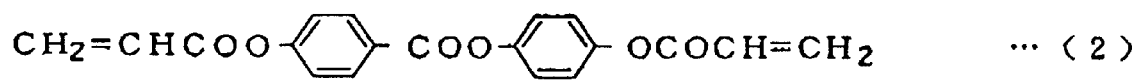
Figure 10C:
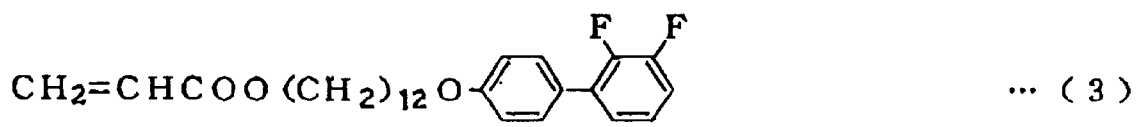
Figure 10D:
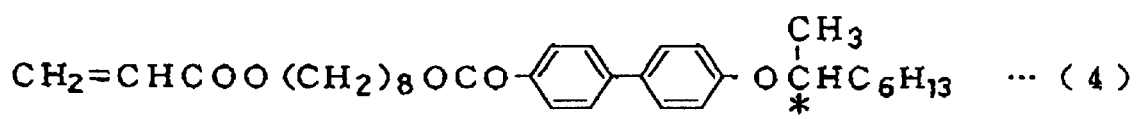
Figure 10E:
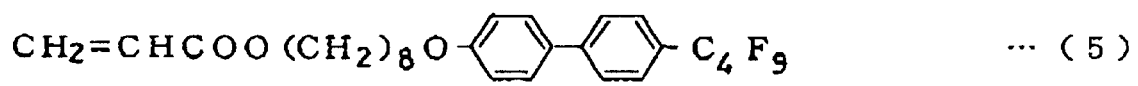

Also the phase series and phase transition temperatures of the acrylate monomer added to SCE8 are set forth below, and the Structural Formula (1) is shown in FIG. 10(a). As can be understood from Structural Formula (1) of FIG. 10(a), the acrylate monomer has a vinyl group ($CH_2$=CH—) as the photopolymeric functional group.

(52.5° C.) (72° C.) (72° C.) (76° C.)

CRYSTAL-SmB PHASE-SmC* PHASE-SmA PHASE-Iso PHASE 1.5 wt % of the acrylate monomer with added polymerisation initiator is then added to the ferroelectric liquid crystal material to prepare a mixture, the resulting mixture being vacuum injected into the space between the electrode substrates 13 and 14 whilst applying heat to maintain the mixture at 100° C.

After filling of the space between the electrode substrates 13 and 14, the mixture is irradiated with ultraviolet light having a wavelength of 365 nm and an intensity of 15 mW/cm² for 3 minutes at 74° C., at which temperature the ferroelectric liquid crystal material remains in the smectic A phase (SmA phase), whereby the acrylate monomer is photopolymerised. Then the mixture is cooled to room temperature at a rate of 2.0° C./min., after which the opening is sealed. As mentioned above, the ultraviolet irradiation step takes place at a temperature (74° C.) at which both the simple substances of SCE8 and the acrylate monomer remain in the SmA phase.

The mixture is then heated to 90° C. again and subsequently cooled to room temperature at a rate of 2.0/min.

The ultraviolet irradiation may take place in a temperature range between 76° C. and 78° C. where the simple substance of SCE8 remains in the SmA phase and the simple substance of the acrylate monomer remains in the isotropic phase (Iso phase), that is the liquid state.

For the purposes of comparison only, several comparative examples of production methods of FLC cells not in accordance with the invention will now be described.

Comparative Example 1

An FLC cell in accordance with a first comparative example is assembled by the following steps.

A pair of electrode substrates having data electrodes, scanning electrodes, insulating films, and alignment films are formed in the same manner as the electrode substrates 13 and 14 described above. An empty cell is assembled by bonding the substrates to each other.

The aforementioned ferroelectric liquid crystal material (SCE8) is then vacuum injected into the space within the cell at 100° C. Subsequently the ferroelectric liquid crystal material is cooled to room temperature at a rate of 2.0° C./min., after which the opening is sealed.

Comparative Example 2

An FLC cell in accordance with a second comparative example is assembled by the following steps.

Initially, 1.5 wt % of the liquid crystalline acrylate monomer (with 2.0 wt % of added polymerisation initiator) as described above is added to the ferroelectric liquid crystal material (SCE8) to prepare a mixture. The resulting mixture is then vacuum injected into the space within the cell at 100° C.

Subsequently the mixture is irradiated with ultraviolet light having a wavelength of 365 nm and an intensity of 15 mW/cm$^2$ for 3 minutes at 100° C., at which temperature the ferroelectric liquid crystal material remains in the isotropic phase (Iso phase), whereby the acrylate monomer is photopolymerised. The mixture is then cooled to room temperature at 2.0° C./min., after which the opening is sealed. The mixture is then re-heated to 90° C. and cooled to room temperature at a rate of 2.0° C./min.

Comparative Example 3

An FLC cell in accordance with a third comparative example is assembled by the following steps.

Initially, 2.0 wt % of polymerisation initiator is added to a liquid crystalline diacrylate monomer having two photopolymeric functional groups. Then 1.5 wt % of the diacrylate monomer (with the added polymerisation initiator) is added to the ferroelectric liquid crystal material (SCE8) to prepare a mixture. The resulting mixture is vacuum injected into the space within the cell at 100° C.

The phase series, phase transition temperatures, and Structural Formula (2) of the diacrylate monomer are set forth below and in FIG. 10(*b*). As can be understood from Structural Formula (2) of FIG. 10(*b*), the diacrylate monomer has two vinyl groups ($CH_2$=C—) as the photopolymeric functional groups.

(102° C.) (144° C.)

CRYSTAL PHASE-N PHASE-Iso PHASE

Subsequently the mixture is irradiated with ultraviolet light having a wavelength of 365 nm and an intensity of 15 mW/cm$^2$ for 3 minutes at 70° C., at which temperature the ferroelectric liquid crystal material remains in the SmA phase. The mixture is then cooled to room temperature at a rate of 2.0° C./min., after which the opening is sealed.

The mixture is then re-heated to 90° C. and subsequently cooled to room temperature at a rate of 2.0° C./min.

Characteristics of Each FLC Cell

In the following, the characteristics of the FLC cell of the Example and FLC cells of Comparative Examples 1 to 3 above will be explained.

Figure 9:
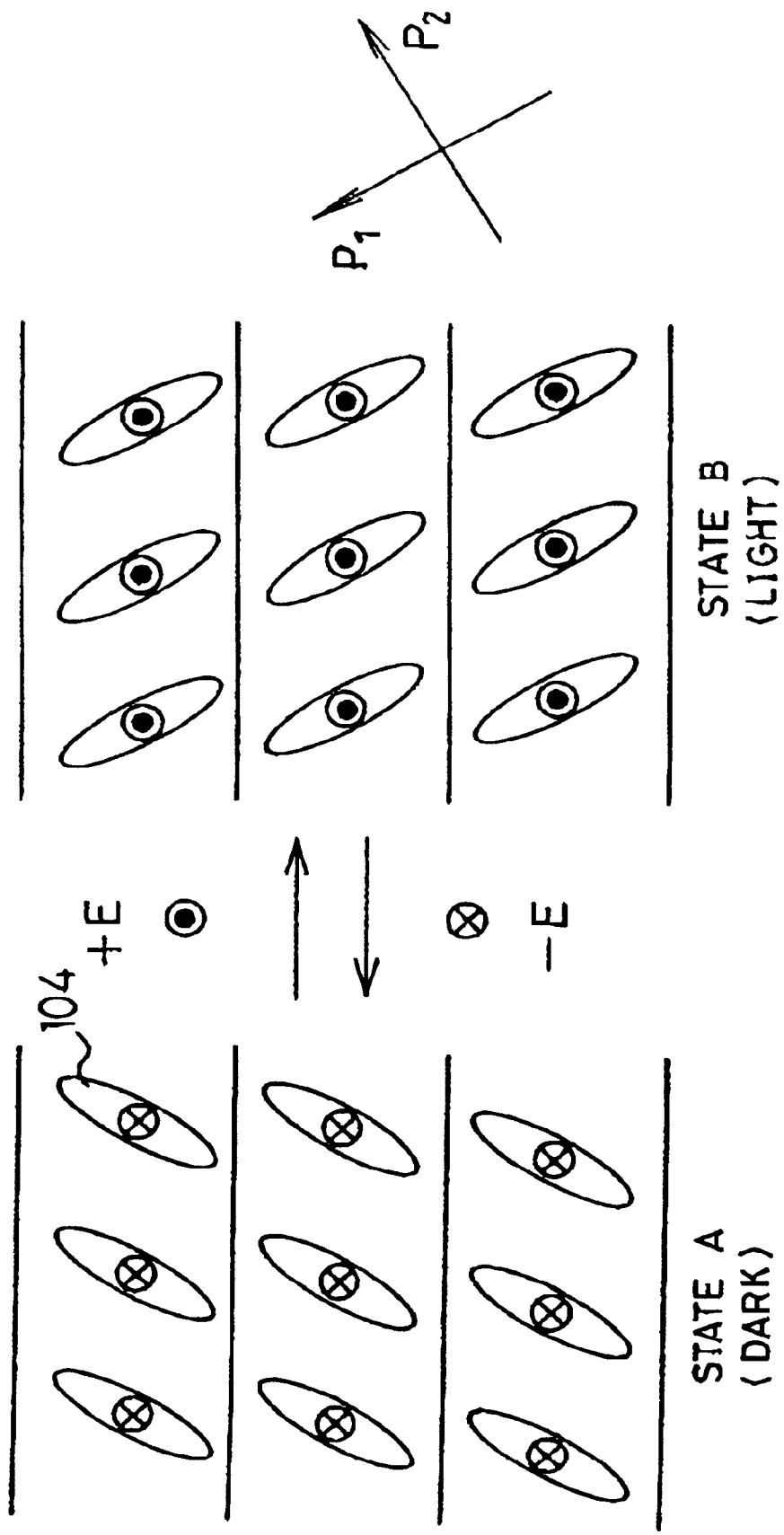
FIG. 9 is a schematic diagram illustrating the principle of operation of a surface stabilised ferroelectric liquid crystal display element.

Firstly, the entire field of view of a polarising microscope is set to black (dark state of FIG. 9). Then a voltage pulse having a frame frequency of 60 Hz and a pulse width of 80 μm is applied to each of the FLC cells described above. The pulse height is then increased to enable checking of changes in the switching domains using a polarising microscope, the results of which are illustrated for the aforementioned Example in accordance with the invention in FIGS. 2 (*a*) to 2 (*d*), and Comparative Example 1 in FIGS. 3 (*a*) to 3 (*d*). FIGS. 2 (*a*) and 3 (*a*) show the dark state and FIGS. 2 (*d*) and 3 (*d*) show the light state.

As shown in FIGS. 3 (*b*) and 3 (*c*), the switching domains develop irregularly in the FLC cell of Comparative Example 1 and are too large by comparison with the pixel width typically about 0.3 mm. Moreover the domains in the non-switching area are unstable.

By contrast, as indicated by the white dots in FIGS. 2 (*b*) and 2 (*c*), switching domains of a satisfactory microscopic size develop regularly in a stable manner in the FLC cell of the Example of the invention, even when the pulse height increases. Thus, since a ratio of the switching area to the total area of the pixel varies with the pulse height, a greyscale display of a desired brightness can be realised by controlling the pulse height. Alternatively, a similar change may be observed by controlling the pulse width whilst the pulse height remains fixed.

The aforementioned effect can be attained when monomers expressed by Structural Formulas (3) to (5) of FIGS. 10(*c*) to 10(*e*) are used instead of the above acrylate monomer. Like the above acrylate monomer, each monomer has one vinyl group ($CH_2$=CH—) as the photopolymeric functional group. The clearing points (temperatures at which liquidation starts) of the monomers expressed by Structural Formulas (3) to (5) are 59.8° C., 19° C., and 45° C., respectively. It should be noted, however, that these three kinds of monomers do not have liquid crystal properties.

Figure 4A:
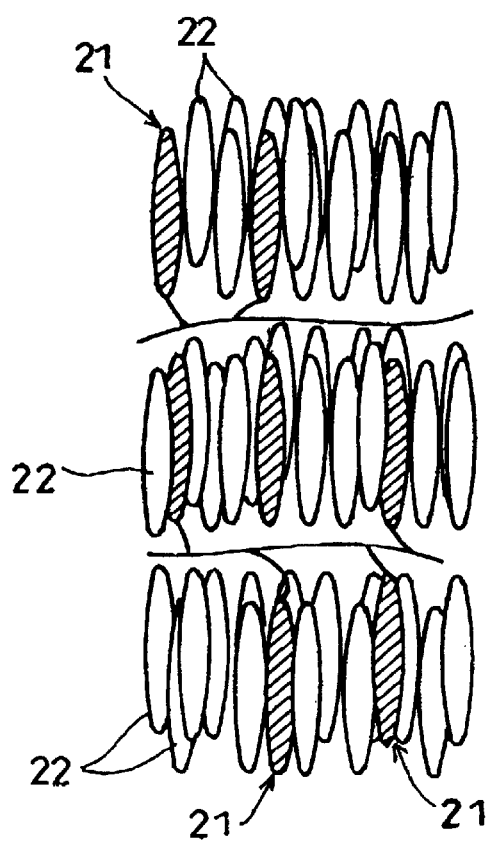
FIG. 4(a) is a schematic diagram illustrating an alignment state of the liquid crystal molecular and polymer molecules formed when a monomer is photopolymerised in the SmA phase.
Figure 4B:
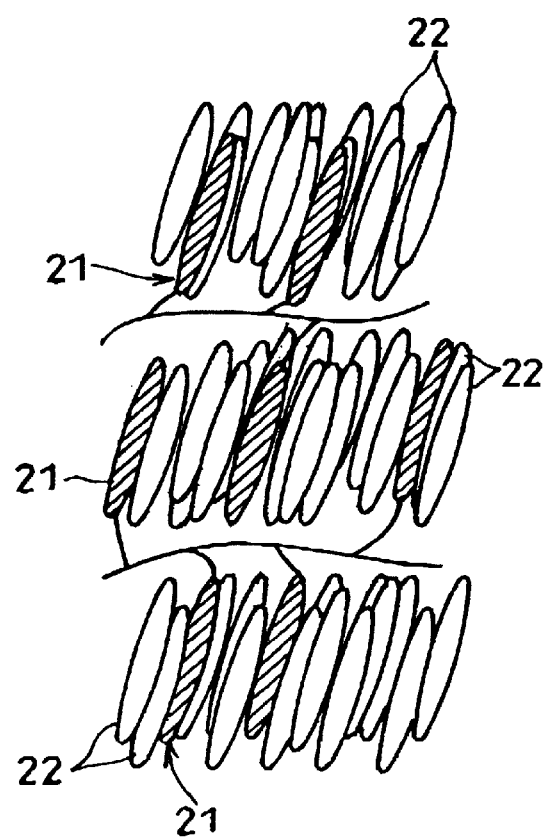
FIG. 4(b) is a schematic diagram illustrating a subsequent alignment state when the liquid crystal molecules change to the SmC* phase as the temperature drops.

The above phenomenon is explained by the alignment of the polymer molecules 21 and liquid crystal molecules 22 as shown in FIGS. 4 (*a*) and 4 (*b*).

In the case of the Example in accordance with the invention described above, the two kinds of molecule are readily aligned uniformly along the rubbing direction and distributed evenly at a temperature at which both the liquid crystal material and the monomer remain in the SmA phase. When the monomer is photopolymerised under these conditions, the polymer molecules 21 form the structure in which the main chain is linked to side chains formed in the smectic structure, as shown in FIG. 4(*a*).

When the molecules are aligned in the above manner, the resulting polymer and liquid crystal material have such excellent compatibility that the polymer neither disturbs the alignment of the liquid crystal molecules nor constrains the liquid crystal molecules. Thus, in use of the polymer-containing liquid crystal layer 10, neither the display quality nor the response rate of the liquid crystal molecules 22 to the electric field are adversely affected to a significant extent.

However, it is acknowledged that use of the monomer outside the range of 0.1 wt % to 10.0 wt % based on the total weight of the mixture, particularly use of more than 10.0 wt % of the monomer, disturbs the uniform alignment of the liquid crystal molecules. It is also acknowledged that in this case the response rate to the electric field is reduced considerably, and hence the driving characteristic deteriorates.

When the phase of the liquid crystal material has chanced to the SmC* phase as the temperature drops further after the polymer is produced, the molecules are aligned as shown in FIG. 4 (b). In this molecular alignment, it is the liquid crystal molecules 22 near to a polymer molecule 21 that are switched, and, since the adjacent polymer molecule 21 has to be switched as well, a huge amount of electric field energy is required in such an area. Consequently, the threshold voltages required for switching vary as between the area near the polymer molecule 21 and the area remote from the polymer molecule 21. The formation of such areas in the liquid crystal layer 10 having different threshold voltages enable greyscale to be realised in the FLC cell of the Example described above.

Figure 5:
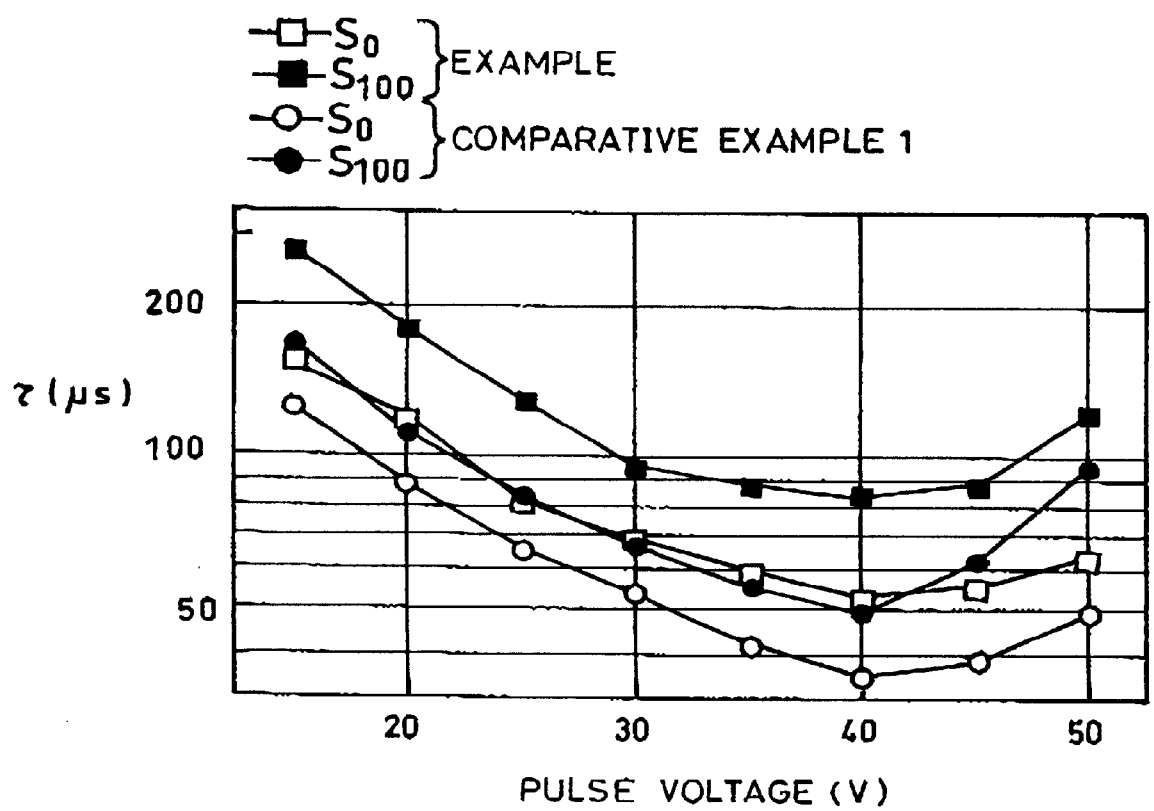
FIG. 5 is a graph showing the $\tau$-V characteristics of the ferroelectric liquid crystal cells of the Example and Comparative Example 1.

FIG. 5 is a graph showing the relationship between the pulse width τ and the pulse height V (τ-V characteristic) which should be satisfied for switching when a voltage pulse is applied to the FLC cells of the Example in accordance with the invention and Comparative Example 1 described above. In the graph, curve $S_0$ indicates the boundary where the switching domains start to develop within the field of view of the microscope, and curve $S_{100}$ indicates the boundary where the entire field of view of the microscope has switched.

As shown in FIG. 5, the gap between the curves $S_0$ and $S_{100}$ of the partial switching region of the FLC cell of the Example in accordance with the invention is wider that the gap between the curves $S_0$ and $S_{100}$ of the FLC cell of Comparative Example 1 above. This indicates that the change in the ratio of the area of the switching domains with respect to the pulse height of the voltage pulse is smaller in the FLC cell of the Example than in the FLC cell of Comparative Example 1. This is preferable in terms of compensating for the changes in the τ-V characteristic caused by an irregular cell gap or changes in ambient temperature.

It should be noted that the graph of FIG. 5 shows the τ-$V_{min}$ characteristic having a minimum value. It is known that a liquid crystal material having negative dielectric anisotropy or large positive biaxial dielectric anisotropy has such a τ-$V_{min}$ characteristic.

Figure 6:
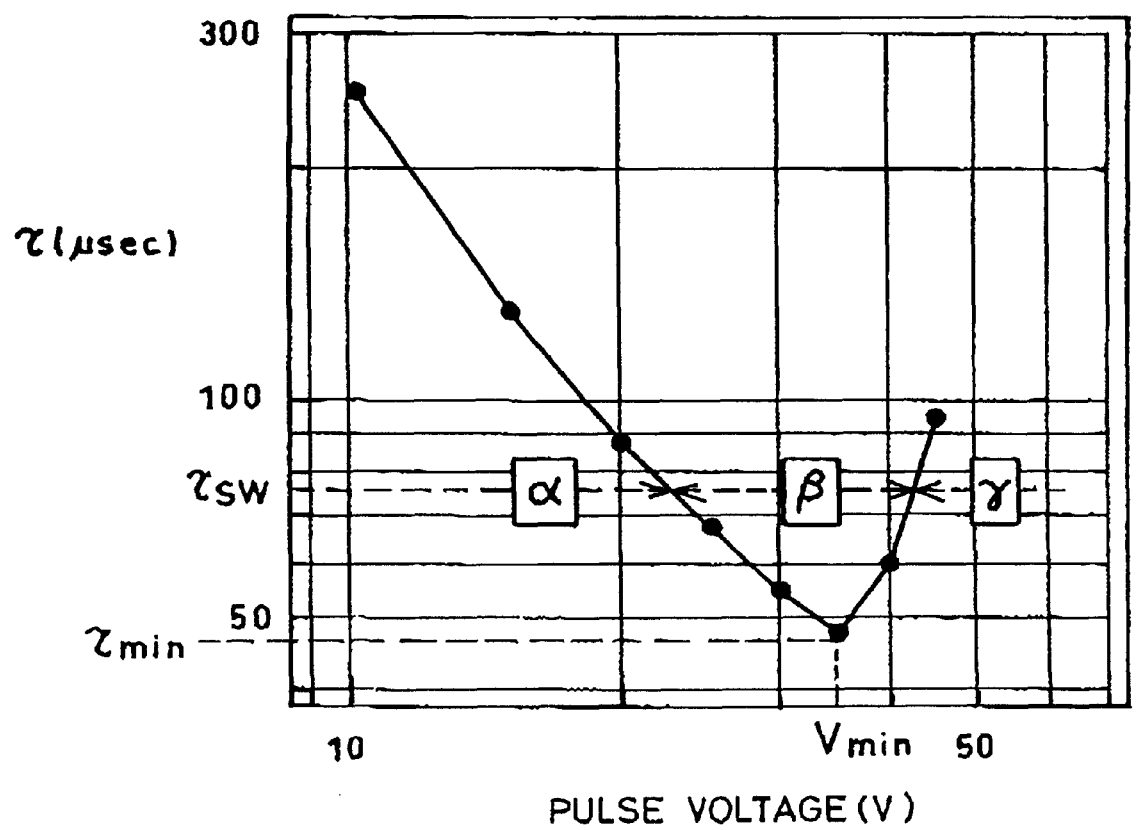
FIG. 6 is a graph showing the $\tau$-V characteristics of a ferroelectric liquid crystal cell having a negative dielectric anisotropy.

The τ-$V_{min}$ characteristic is represented by a curve indicating the relationship between the voltage pulse width (τ) and the pulse height (V) which should be satisfied to effect switching by application of a pulse voltage of minimum value as shown in FIG. 6. The dielectric anisotropy is the difference between ε and ε,L, that is, Δε=ε−ε,L, where ε and ε,L are dielectric constants in the parallel and vertical directions with respect to an alignment vector of the liquid crystal molecules.

If θ is the angle of alignment of the vector of the liquid crystal molecules with respect to the applied electric field E, then a spontaneous polarisation torque $T_P$ generated by the interaction of the spontaneous polarisation and the electric field may be expressed by Equation (1) below, whereas the dielectric torque $T_E$ exerted by the dielectric anisotropy and the electric field acting on the liquid crystal molecules is expressed by the Equation (2) below:

$$T_P P_S \cdot E \tag{1}$$

$$T_E \Delta \varepsilon E^2 \sin 2\theta \tag{2}$$

Therefore, where the dielectric anisotropy is negative (Δε<0), the dielectric torque acts to align the liquid crystal molecules along the cell interface, which slows down the rising of the optical response. If the absolute value of the negative dielectric anisotropy is large, the dielectric torque exceeds the torque based on the spontaneous polarisation when an electric field equal to, or higher than, a certain electric field is applied, thereby acting to inhibit switching. Consequently, a high electric field demands a longer pulse width, and, for this reason, the τ-V curve has a minimum value ($V_{min}$·$τ_{min}$) as shown in FIG. 6. This characteristic is generally referred to as the τ-$V_{min}$ mode, and use of this characteristic provides the advantages described in the following.

If a pulsed electric field having a pulse width $τ_{SW}$ is applied, then the switching does not occur in an area α but the switching does occur in an area β having a voltage equal to or above the threshold voltage. If the τ-V curve does not have a minimum value, switching between the area α and area β is suppressed, but, if the τ-V curve has the minimum value, switching does not occur in an area γ of high electric field in addition to the areas α and β. Consequently, switching can be controlled using these three areas. In other words, switching control between the areas α and β can be replaced by switching control between the areas β and γ. The switching control between the areas β and γ is advantageous in that the switching response is faster compared with the switching control between the areas α and β because a larger electric field is applied to the FLC cell.

Another advantage is that an AC field stabilisation (see J. C. Jones, M. J. Towler and E. P. Raynes: Ferroelectrics 121 (1991) pp.91–102) is attained to maintain the bistable state by applying an AC electric field during a non-switching period using the property that the dielectric anisotropy is negative. The effect thus attained makes it possible to increase the memory angle and improve contrast and brightness.

The C2 uniform state (C2U) appears in each of the FLC cells of the Example in accordance with the invention and Comparative Examples 1 and 2 above, while the C1 uniform state (C1U) appears in the FLC cell of Comparative Example 3 above. An explanation of the C1 and C2 states will be given in the following.

Figure 7:
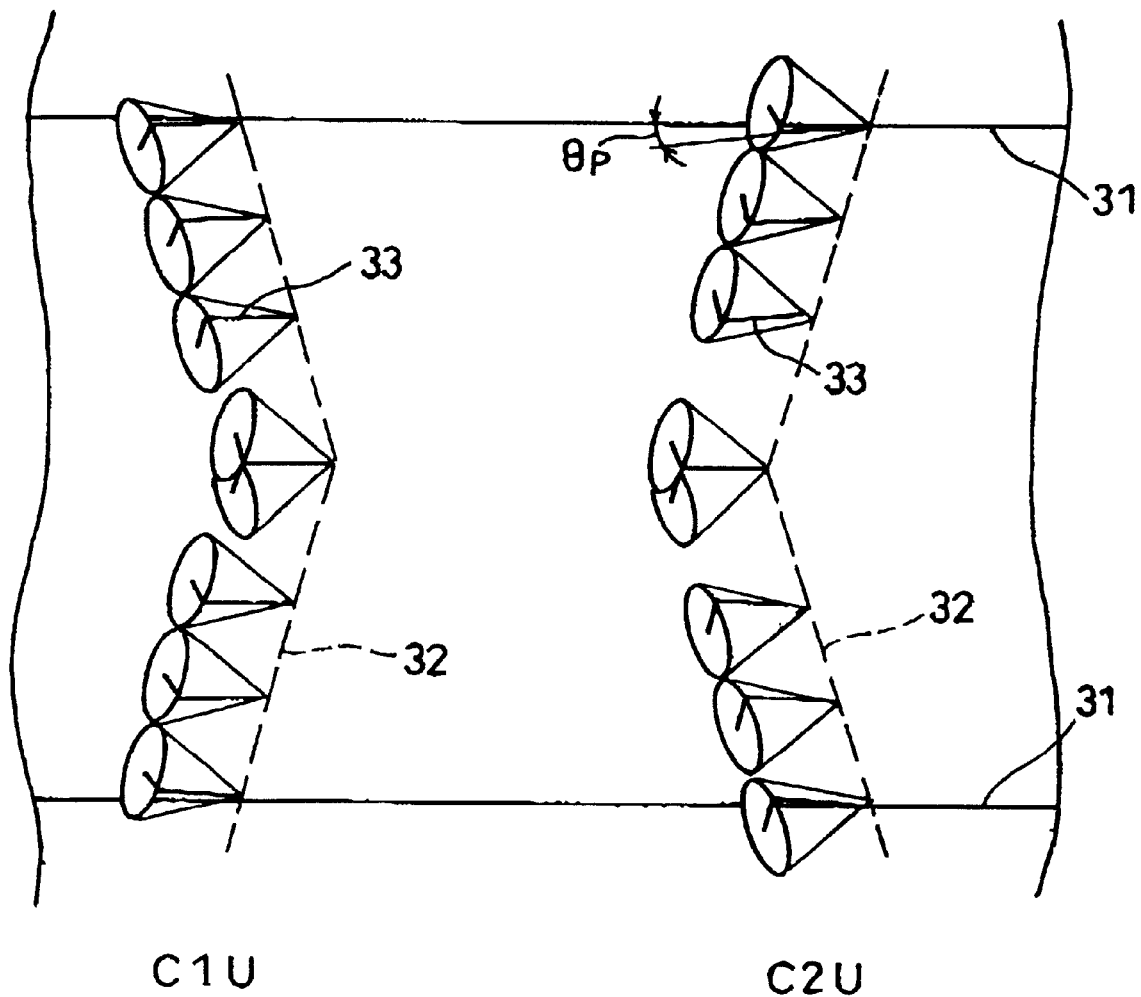
FIG. 7 is a schematic diagram illustrating C1U and C2U states.
Figure 8A:
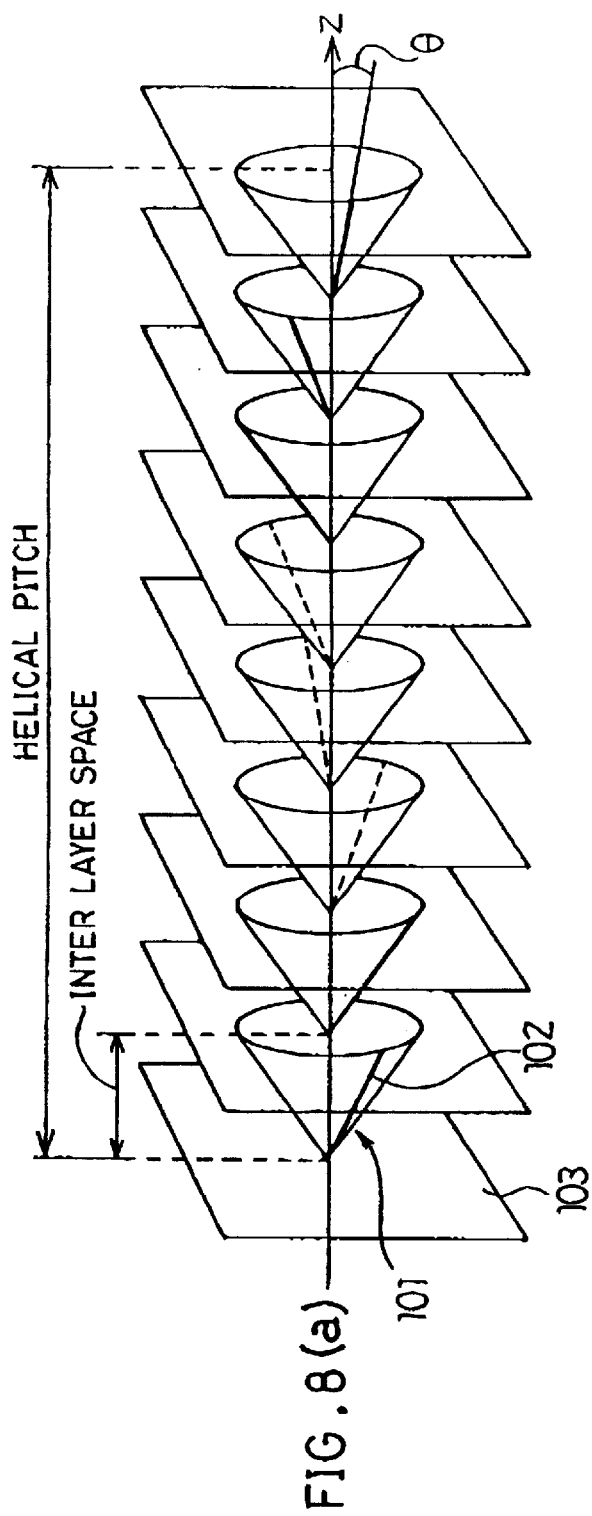
FIG. 8(a) is a schematic diagram illustrating the states of the ferroelectric liquid crystal molecules in the SmC* phase.
Figure 8B:
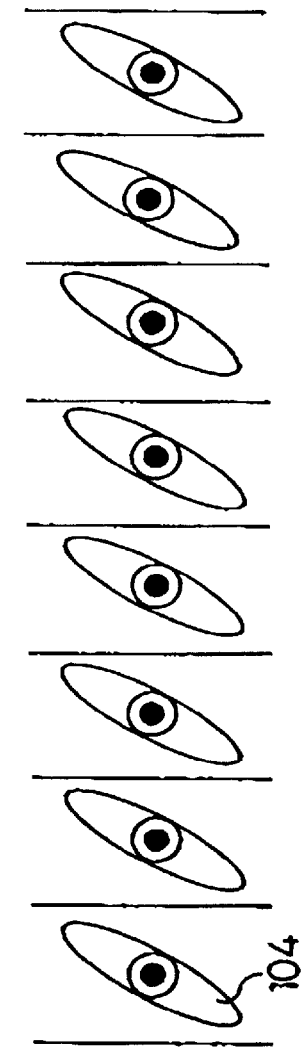
FIG. 8(b) is a schematic diagram illustrating a state in which the helical structure of the molecules is lost in a cell in which the gap is less than the helical pitch.

As shown in FIG. 7, the C1 and C2 states are distinguished from one another by the relationship between the bending direction of the chevron layer structure and the direction of the pretilt of the liquid crystal molecules 33 existing at the interface of the glass substrates 31 and the liquid crystal layer 32. More specifically, the C2 state is the state in which the chevron structure bends to the side on which the liquid crystal molecules 33 close to the interface have a pretilt angle $θ_P$ with respect to the interface, whereas the C1 state is the state in which the chevron structure bends away from that side. Since a zigzag defect occurs at the boundary between chevron layer structures bending in opposite directions, the C1 and C2 states can be distinguished from each other based on the relationship between the direction of the zigzag defect and the rubbing direction.

The C1 state is advantageous in that it readily appears under conditions of a large pretilt angle and a small tilt angle, while having a large memory angle. On the other hand, the C2 state exceeds the C1 state in having a faster response and greater switching stability in the low temperature area. The uniform state means that the liquid crystal molecules 33 are aligned uniformly in the space between the glass substrates 31. Thus, the C2U state shown on the right hand side of FIG. 7 is suitable for a display device because it can provide high contrast.

The reason why the C1U state appears in the FLC cell of Comparative Example 3 above is assumed to be as follows.

Generally a ferroelectric liquid crystal material changes phase in order of the isotropic phase, N phase, SmA phase, and SmC phase as the temperature drops. At the transition from the SmA phase to the SmC phase, the C1 state appears first and then the C2 state appears when the temperature drops slightly.

Since a liquid crystalline diacrylate monomer is used as the monomer in Comparative Example 3 above, a 3-D network structure is formed in the SmA phase. The 3-D network structure acts to maintain the liquid crystal molecule alignment in the SmA phase after the ferroelectric liquid crystal material has changed to the SmC*phase. This inhibits the change from the C1 state to the C2 state, even when the temperature drops. This is the reason why the SCE8 material, which tends to have the C2 state, actually has the C1 state.

In the FLC cell of Comparative Example 3 above, the 3-D network structure constrains the liquid crystal molecules so strictly that the satisfactory alignment and switching characteristics are lost. By contrast, in the case of the FLC cells of the Example in accordance with the invention and Comparative Example 2, the 3-D network structure is not formed because an acrylate monomer having only a single photopolymeric functional group is used, and, for this reason, the liquid crystal molecules are free to move.

In a case, such as the Comparative Example 2 above, where the monomer is photopolymerised at a temperature where both the liquid crystal material and the monomer remain in the isotropic phase, some of the effects similar to those realised in the Example in accordance with the invention above are observed, but the alignment and the switching characteristics are not as good as those of the Example above. In particular, the regularity of the switching domains is not satisfactory, and the reason why this is so is assumed to be that the compatibility of the polymer produced at such a temperature and the liquid crystal material is so small that the polymer is aligned neither uniformly nor regularly among the liquid crystal molecules while the temperature drops.

Furthermore, the monomer may be polymerised at a temperature at which the liquid crystal material remains in the SmA phase and the monomer remains in the isotropic phase. Since the monomer remains in the liquid state at this temperature, the compatibility of the liquid crystal material and the monomer is satisfactory but less satisfactory than the case where the monomer remains in the liquid crystal phase. Nevertheless, the monomer molecules are aligned uniformly along the alignment of the liquid crystal molecules, and the polymer produced under these conditions does not disturb the alignment of the liquid crystal molecules.

The amount of the acrylate monomer contained in the mixture in the Example in accordance with the invention above is 1.5 wt %, and is preferably in the range between 0.1 wt % and 10 wt %. Consequently the polymer molecules are distributed in an adequate manner, and the uniform alignment of the liquid crystal is left intact. Consequently, not only can the display quality be maintained, but also the viscosity of the liquid crystal layer 10 does not increase.

Further manufacturing methods in accordance with the invention, which will now be described, may be applied to the production of a ferroelectric liquid crystal display in which a layer of ferroelectric liquid crystal material in the chiral smectic phase is contained between two glass substrates spaced apart by spacers by a distance of typically 1–3 mm so as to extend parallel to one another. Transparent ITO (indium tin oxide) electrode structures are applied to the inwardly directed faces of the substrates, the electrode structures being in the form of electrode tracks arranged parallel to one another. The tracks of one of the structures are arranged in rows and the tracks of the other structure are arranged in columns extending perpendicularly to the rows, so as to enable pixels at the intersections of the rows and columns to be addressed in known manner by the application of a suitable strobe and data pulses to the appropriate intersecting tacks of the electrode structures.

A thin polymer alignment layer, for example a polyamide alignment layer, is applied to the inwardly directed face of each substrate in known manner, each alignment layer being rubbed in a required rubbing direction so as to provide a required pretilt angle by buffing with a soft cloth made of rayon, for example, in order to impart a preferred alignment to the molecules of the liquid crystal material in the vicinity of the alignment layers. The rubbing directions of the two alignment layers are typically parallel and in the same direction. Polariser and analyser layers polarised in mutually transverse directions are applied to the outwardly directed faces of the substrates in known manner.

In operation of such a display the application of suitable strobe and data pulses to the electrode tracks serves to switch selected pixels from one state to the other, that is from the light state to the dark state for example. During such switching of pixels from one state to the other, not all regions of the liquid crystal material within each pixel change state simultaneously. One aspect of the present invention is based on the realisation that points within the cell can act as nucleation points in the switching process, and the liquid crystal material in the immediate vicinity of these points will alter its state more readily than liquid crystal material more distant from these points. Thus the liquid crystal material at these nucleation points will switch at a different applied voltage than the surrounding liquid crystal material, and domains of the material switched in this manner will grow outwardly from these points. Two mechanisms are believed to be mainly responsible for this effect, namely elastic deformation and variations in the effective field applied as a result of the switching voltage. If a switching voltage of sufficient magnitude is applied for a very short time, only the liquid crystal material in the immediate vicinity of the nucleation points will change state, and as a result small switched domains will be produced. On the other hand, if the switching voltage is applied for a longer time, the domains of liquid crystal material which has changed state will be greater. When the domains produced in this matter within a pixel have grown so as to meet one another, the pixel will have fully changed state.

By reducing the voltage and/or the duration of the applied switching signal, it is possible to arrange for partial switching of the displayed pixel, that is switching of the liquid crystal material within the pixel so that only a part of the material changes state. If the two fully switched states of the display correspond to black and white respectively, partial switching may be used to display different levels of analogue grey.

In applying a method in accordance with the invention to control domain formation for the purposes of displaying analogue greyscale, it is important that the domain size should be smaller than the smallest sub-pixel which is to be switched, and that the domain distribution is as homogenous as possible across the display panel. Smaller domain size results in better pixel-to-pixel uniformity of grey level and an increase in the number of addressable levels. In order to enable a number of different grey levels to be displayed, the device advantageously has a wide partial switching region, that is a wide area within the $\tau$-$V_{min}$ plot of switching time $\tau$ against applied voltage V between the curve (100%) producing switching of all regions within a pixel and the curve (0%) at which the regions within a pixel will just start to switch. In order to provide different levels of grey using analogue greyscale techniques, the region of the switching characteristic between the 0% and 100% curves is utilised, and the distinctions between the different magnitudes and durations of the applied voltage required to produce the different grey levels are less critical if the device has a wide partial switching region. This decreases the error which is obtained in any given set of grey levels because, if the partial switching region is wide, any movement of the partial switching curve (due to voltage, thickness, temperature fluctuations, etc.) produces a smaller change in the transmission of the grey level.

The method of the invention may also be applied to the case of a multithreshold modulation (MTM) display, such as is disclosed in U.S. Pat. No. 4,712,877, in which different regions of a single pixel are arranged to have different switching thresholds, so that different regions of the pixel can be switched by application of suitable waveforms so as to give different discrete grey levels. In this case the partial switching region should be as narrow as possible since each region of the pixel has its own $\tau$-$V_{min}$ curve and partial switching region, and there must be non-overlapping regions between these curves for correct addressing. It is possible to control domain formation by the method of the invention in order to provide the required partial switching regions for the different parts of the pixel.

For standard, non-greyscale addressing of pixels, the speed at which the pixels can be addressed is enhanced by the use of the so-called Malvern addressing scheme, as disclosed in J. R. Hughes and E. P. Raynes, Liq. Cryst. 13, 4 (1993) 597–601, and the speed of addressing is determined by the degree to which this scheme can be applied to the strobe waveform. If the pixels are arranged to have a narrow partial switching region by control of domain formation by the method of the invention, the addressing scheme can be applied to a high level, thus permitting particularly fast addressing.

As is well known the liquid crystal material is aligned during manufacture after introduction into the cell produced by interconnection of the two glass substrates, by cooling the cell and the liquid crystal material contained therein through the higher temperature phases to the required chiral smectic phase. When in the chiral smectic phase, the liquid crystal molecules are uniformly aligned in microlayers extending perpendicularly to the glass substrates, the molecules in each layer adopting a chevron geometry due to the alignment of the molecules with the substrates on both sides of the liquid crystal layer as described in J. Kanbe et al, Ferroelectrics 114 (1991) 3–26. The alignment of the molecules may be either in the C2 state or in the C1 state and both states may occur in the same device, although it is preferred that all the molecules are aligned in the C2 state in the working device.

Further Example 1

Figure 11:
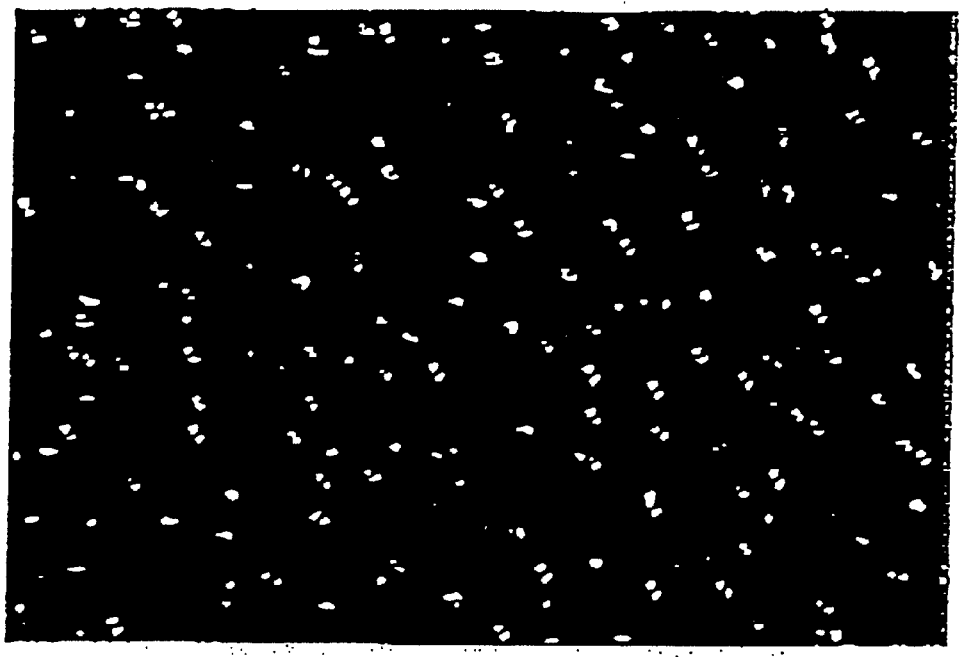
FIG. 11 is a micrograph of the spherical nucleation points formed by phase separation out of the discotic dopant DB126 from the ferroelectric liquid crystal mixture SCE8 in a method in accordance with the invention.

In a further manufacturing method in accordance with the invention, 0.2% of the discotic dopant DB126 was dissolved in the isotropic phase of the ferroelectric liquid crystal mixture SCE8 available from Hoechst AG, 6230 Frankfurt am Main 80, Germany. Thorough mixing of the resulting mixture was carried out in the isotropic phase in order to ensure uniform distribution of the discotic dopant within the mixture. The cell produced by connection of the two glass substrates as described above was then filled with the doped mixture in the isotropic phase, and the cell was slowly cooled to room temperature resulting in phase separation of the discotic dopant occurring just below the nematic to smectic A phase transition. As shown in FIG. 11 the phase separated discotic dopant formed a uniform distribution of droplets in the smectic C phase at room temperature. These droplets may then act as nucleation points for formation of the domains during switching of the device.

Further Example 2

Figure 12:
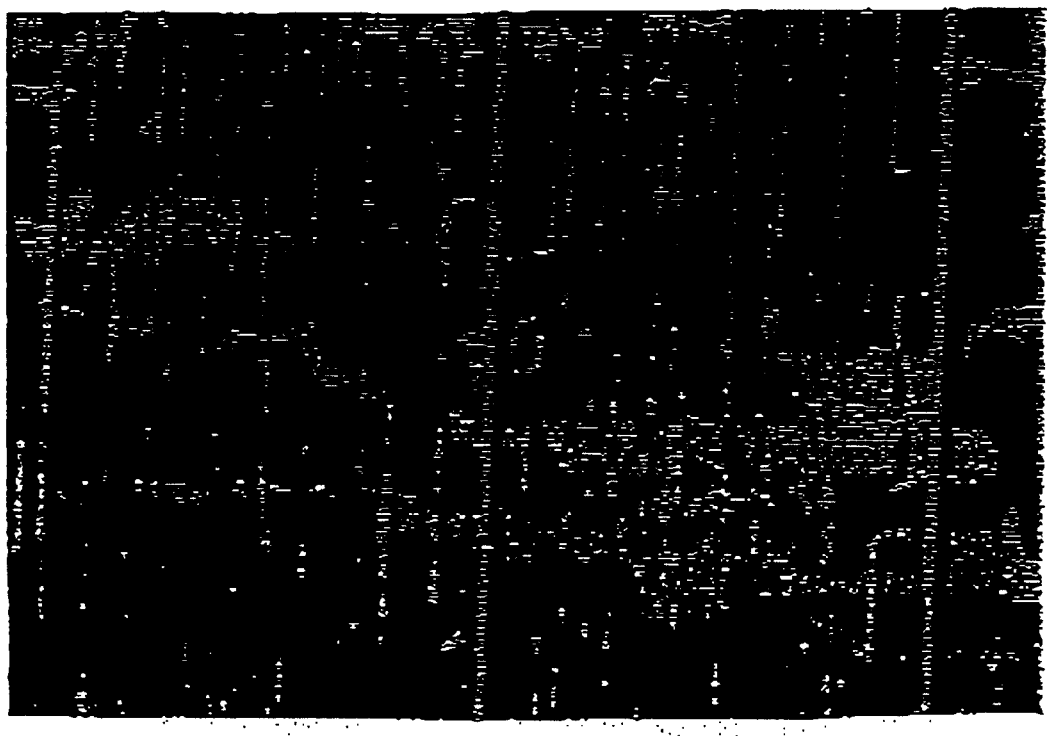
FIG. 12 is a micrograph of the needle nucleation points formed by phase separation out of the discotic dopant HET7 from the ferroelectric liquid crystal mixture SCE8 in a further method in accordance with the invention.

In a still further manufacturing method in accordance with the invention, 0.42% of the discotic dopant HET7 was dissolved in the isotropic phase of the ferroelectric liquid crystal mixture SCE8, and, after thorough mixing in the isotropic phase to ensure uniform distribution of the discotic dopant, the mixture was introduced into the cell in the isotropic phase. The cell was slowly cooled to room temperature, resulting in phase separation of the discotic dopant occurring in the smectic C phase to form needles as shown in FIG. 12. Such production of nucleation points in the form of needles demonstrates that the shape of the nucleation points can be controlled by the chemical structure of the dopant, and that the nucleation points may be anisotropic in form. Since these needles were formed in the smectic phase, they were probably orientated along the smectic layers.

Figure 13:
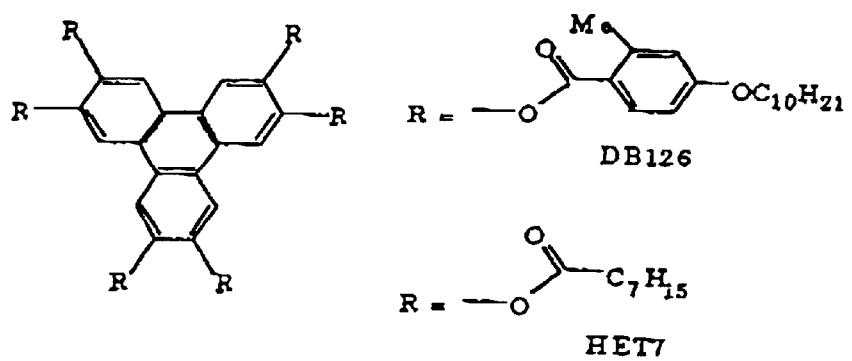
FIG. 13 shows the chemical structure of DB126 and HET7.

FIG. 13 shows the chemical structure of the two dopants DB126 and HET7 referred to above, the generalised molecular structure of both dopants being shown on the left hand side of the figure, and the form of the substituent R being shown in each case on the right hand side of the figure.

Figure 14:
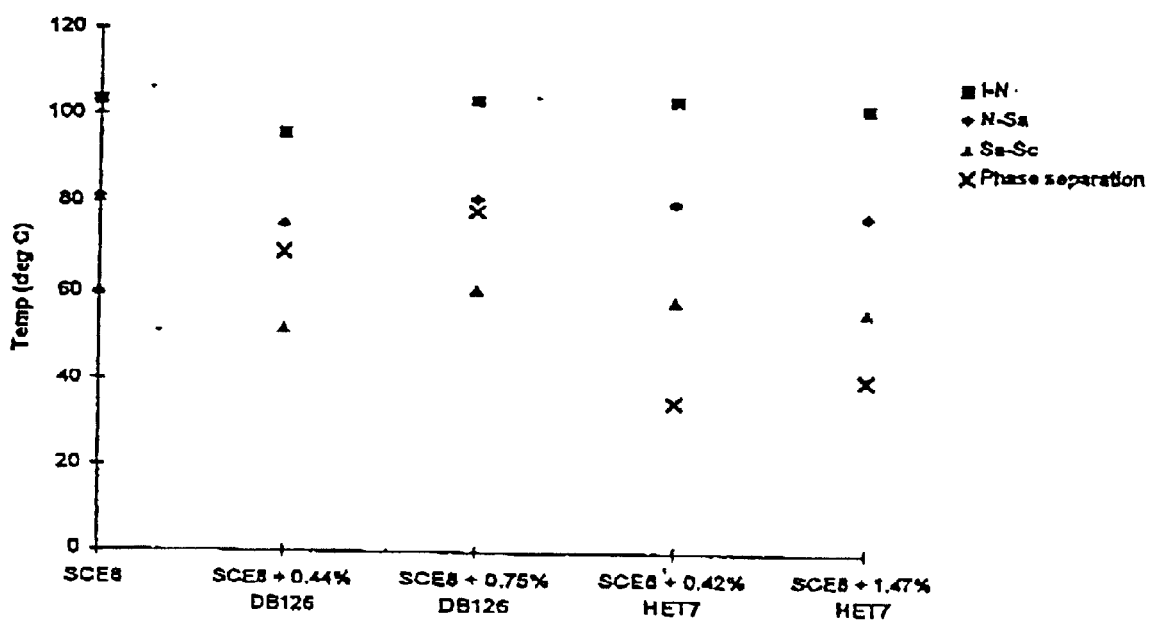
FIG. 14 is a graph showing the temperature at which phase separation occurs as a function of dopant material and concentration in these methods.

The graph of FIG. 14 shows the temperature, indicated by X, at which the phase separation occurs for the cases in which 0.44% DB126 and 0.75% DB126 are added to the liquid crystal mixture, as well as the cases in which 0.42% HET7 and 1.47% HET7 are added to the mixture. In the first two cases it will be seen that the phase separation occurs in the smectic A phase, that is between the nematic to smectic A phase transition temperature (indicated by a black rhombus) and the smectic A to smectic C phase transition temperature (indicated by a black rectangle), whereas, in the last two cases, the phase separation occurs in the smectic C state, that is below the smectic A to smectic C phase transition temperature. It will be appreciated from this graph that the temperature at which the phase separation occurs can be varied by suitable choice of dopant and dopant concentration. In FIG. 4, the black rectangle indicates the transition temperature from the isotropic phase to the nematic phase.

In order to obtain a more uniform and controlled distribution of nucleation points, it may be advantageous to ensure that the liquid crystal and dopant mixture is biphasic over a broad temperature range. The mixture is biphasic if different regions of the mixture exist in different phases at a uniform temperature. A broad biphasic temperature range can be obtained by using liquid crystal and dopant materials having markedly different phase transition temperatures.

FIG. 16(a) shows a photograph of a 1 mm square region of the liquid crystal mixture SCE8 showing the switching domains produced during addressing of the cell. For comparison FIG. 16(b) shows a corresponding region of the liquid crystal mixture SCE8 to which 0.2% of the discotic dopant DB126 has been added by the manufacturing method of Further Example 1, this figure illustrating the more uniform switching of the material during similar addressing as a result of control of domain formation by the nucleation points produced by separation out of the dopant. In each case a typical 300 µm square pixel divided into three coloured sub-pixels is shown alongside the region in order to illustrate the relative dimensions. FIG. 15 schematically illustrates the addressing scheme used for switching of the material shown in FIGS. 16(a) and 16(b). The form of the strobe pulse applied to the rows of electrode tracks is shown on the left hand side of the figure, and the forms of the respective data pulses are shown along the top of the figure, with the forms of the corresponding resultant pulses being shown below the data pulses. In each case the resultant pulse is the waveform which is applied across a pixel as a result of the combined effect of the strobe pulse applied to the corresponding row electrode track and either a switching pulse, a non-switching pulse or an intermediate pulse applied as data to the corresponding column electrode track. Such waveforms were developed for analogue greyscale addressing and are described in GB 2294797A. FIGS. 16(a) and 16(b) show the material addressed by the intermediate data waveform.

Furthermore FIG. 17(a) is a $\tau$-$V_{min}$ plot of switching time $\tau$ against strobe voltage V for the ferroelectric liquid crystal mixture SCE8 to which 0.2% of the discotic dopant DB126 has been added by the manufacturing method of Further Example 1, FIG. 17(b) showing a corresponding plot for pure SCE8 for comparison purposes. In each case measurements were made using a single pulse addressing waveform consisting of square strobe pulses whose voltages are plotted on the x axis and whose widths are plotted on the y axis. Comparison of these two plots shows that the nucleation points produced by the discotic dopant do not adversely affect the switching speed of the material to any great extent.

As previously described it is advantageous for the analogue greyscale to provide a wide area within the $\tau$-$V_{min}$ plot between the 0% and 100% curves. This can be achieved if more than one type of nucleation point is created. In a possible development of the invention two types of nucleation point are provided by mixing two types of dopant with the liquid crystal mixture only one of the two dopants undergoing photoinduced phase separation. In this method phase separation of one of the dopants occurs without photoinduction, thus forming nucleation points of one type, and photoinduced phase separation of the other dopant also occurs, possibly at a different temperature or phase, so as to form a second type of nucleation point. The effects of these two types of nucleation point on the main formation will be substantially different, so that a wide area between the 0% and 100% curves on the $\tau$-$V_{min}$ plot results.

What is claimed is:

1. A method of manufacturing a liquid crystal device which includes a cell comprising a layer of liquid crystal material contained between two substrates, the method comprising the steps of:
   (a) adding to the liquid crystal material under predetermined applied conditions a dopant which is miscible with the liquid crystal material under said conditions; and
   (b) changing the conditions applied to the liquid crystal material so as to cause separation of the dopant out of the liquid crystal material which provides a plurality of anisotropic nucleation points for controlling domain formation within the liquid crystal material and keeping the liquid crystal material alignment.

2. A method according to claim 1, wherein said separation of the dopant out of the liquid crystal material is caused by the application of ultraviolet radiation to the liquid crystal material.

3. A method according to claim 1, wherein said separation of the dopant out of the liquid crystal material provides a plurality of nucleation points for controlling switching of domains within the liquid crystal material between two or more stable states in operation of the device.

4. A method according to claim 1, for manufacture of a ferroelectric liquid crystal device, wherein said separation of the dopant out of the liquid crystal material provides a plurality of nucleation points for controlling transitions between two alignment states of the liquid crystal device.

5. A method according to claim 1, for manufacture of a pi-cell device, wherein said separation of the dopant out of the liquid crystal material provides a plurality of nucleation points for controlling nucleation of V state in the device.

6. A method according to claim 1, wherein two or more dopants are added to the liquid crystal material and separation of the dopants out of the liquid crystal material occurs under different conditions in order to provide a wide area between 0% and 100% switching curves.

7. A method according to claim 6, wherein said separation of one of the dopants is caused by the application of electromagnetic radiation, whereas said separation of another dopant is caused in some other manner.

8. A method of manufacturing a liquid crystal device which includes a cell comprising a layer of liquid crystal material contained between two substrates, the method comprising the steps of:
   (a) adding to the liquid crystal material under predetermined applied conditions a dopant which is miscible with the liquid crystal material under said conditions; and
   (b) changing the temperature of the liquid crystal material so as to cause separation of the dopant out of the liquid crystal material in order to provide a plurality of nucleation points for controlling domain formation within the liquid crystal material.

9. A method according to claim 8, wherein said separation of the dopant out of the liquid crystal material provides a plurality of nucleation points for controlling switching of domains within the liquid crystal material between two or more stable states in operation of the device.

10. A method according to claim 8, for manufacture of a ferroelectric liquid crystal device, wherein said separation of the dopant out of the liquid crystal material provides a plurality of nucleation points for controlling transitions between two alignment states of the liquid crystal device.

11. A method according to claim 8, for manufacture of a pi-cell device, wherein said separation of the dopant out of the liquid crystal material provides a plurality of nucleation points for controlling nucleation of V state in the device.

12. A method of manufacturing a liquid crystal device which includes a cell comprising a layer of liquid crystal material contained between two substrates, the method comprising the steps of:
   (a) adding to the liquid crystal material under predetermined applied conditions a dopant which is miscible with the liquid crystal material under said conditions; and
   (b) changing the phase of the liquid crystal material so as to cause separation of the dopant out of the liquid crystal material in order to provide a plurality of nucleation points for controlling domain formation within the liquid crystal material.

13. A method according to claim 12, wherein said separation of the dopant out of the liquid crystal material provides a plurality of nucleation points for controlling switching of domains within the liquid crystal material between two or more stable states in operation of the device.

14. A method according to claim 12, for manufacture of a ferroelectric liquid crystal device, wherein said separation of the dopant out of the liquid crystal material provides a plurality of nucleation points for controlling transitions between two alignment states of the liquid crystal device.

15. A method according to claim 12, for manufacture of a pi-cell device, wherein said separation of the dopant out of the liquid crystal material provides a plurality of nucleation points for controlling nucleation of V state in the device.

16. A method of manufacturing a liquid crystal device which includes a cell comprising a layer of liquid crystal material contained between two substrates, the method comprising the steps of:
   (a) adding to the liquid crystal material under predetermined applied conditions a dopant which is miscible with the liquid crystal material under said conditions; and
   (b) changing the phase of the dopant so as to cause separation of the dopant out of the liquid crystal material in order to provide a plurality of nucleation points for controlling domain formation within the liquid crystal material.

17. A liquid crystal device including a cell comprising a layer of liquid crystal material contained between two substrates, the liquid crystal material incorporating a dopant which has been mixed with the liquid crystal material under predetermined applied conditions and which has been caused to separate out of the liquid crystal material due to a change in the applied conditions in order to provide a plurality of anisotropic nucleation points for controlling domain formation within the liquid crystal material and keeping the liquid crystal material alignment.

18. A method of manufacturing a liquid crystal device which includes a cell comprising a layer of liquid crystal material contained between two substrates, the method comprising the steps of:
   (a) adding to the liquid crystal material under predetermined applied conditions a dopant which is miscible with the liquid crystal material under said conditions; and
   (b) applying ultraviolet radiation to the liquid crystal material or the dopant so as to cause separation of the dopant out of the liquid crystal material in order to provide a plurality of nucleation points for controlling transitions between two alignment states of the liquid crystal device.

19. A method of manufacturing a pi-cell liquid crystal device which includes a cell comprising a layer of liquid crystal material contained between two substrates, the method comprising the steps of:
   (a) adding to the liquid crystal material under predetermined applied conditions a dopant which is miscible with the liquid crystal material under said conditions; and
   (b) applying ultraviolet radiation to the liquid crystal material or the dopant so as to cause separation of the dopant out of the liquid crystal material in order to provide a plurality of nucleation points for controlling nucleation of V states in the liquid crystal device.

20. A method of manufacturing a liquid crystal device which includes a cell comprising a layer of liquid crystal material contained between two substrates, the method comprising the steps of:
   (a) adding to the liquid crystal material under predetermined applied conditions a dopant which is miscible with the liquid crystal material under said conditions; and
   (b) changing the conditions applied to the liquid crystal material so as to cause separation of the dopant out of the liquid crystal material in order to provide a plurality of nucleation points for controlling domain formation within the liquid crystal material,
   wherein two or more dopants are added to the liquid crystal material and separation of the dopants out of the liquid crystal material occurs under different conditions in order to provide a wide area between 0% and 100% switching curves.

* * * * *

UNITED STATES PATENT AND TRADEMARK OFFICE
CERTIFICATE OF CORRECTION

PATENT NO.    : 6,151,096
DATED         : November 21, 2000
INVENTOR(S)   : McDonnell, et al.

It is certified that error appears in the above-identified patent and that said Letters Patent is hereby corrected as shown below:

<u>Title page,</u>
Insert item [30] Foreign Application Priority Data

December 05, 1996 [JP] Japan ......................8-325085
December 05, 1996 [UK] United Kingdom..........9625324.0

Signed and Sealed this

Twenty-third Day of October, 2001

Attest:

NICHOLAS P. GODICI
Attesting Officer     Acting Director of the United States Patent and Trademark Office